(12) United States Patent
Katayama

(10) Patent No.: US 8,786,898 B2
(45) Date of Patent: Jul. 22, 2014

(54) COLOR SELECTING METHOD, IMAGE PROCESSING METHOD, IMAGE PROCESSING APPARATUS, AND COMPUTER-READABLE RECORDING MEDIUM STORING PROGRAM

(75) Inventor: Takeshi Katayama, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 614 days.

(21) Appl. No.: 12/885,294

(22) Filed: Sep. 17, 2010

(65) Prior Publication Data

US 2011/0069332 A1     Mar. 24, 2011

(30) Foreign Application Priority Data

Sep. 19, 2009 (JP) ................................ 2009-218211
Jan. 15, 2010 (JP) ................................ 2010-007263
Jul. 21, 2010 (JP) ................................ 2010-164094

(51) Int. Cl.
*H04N 1/60* (2006.01)

(52) U.S. Cl.
USPC ............. 358/1.9; 358/504; 358/519; 358/520

(58) Field of Classification Search
USPC ................................................ 358/1.1–3.29
See application file for complete search history.

(56) References Cited

U.S. PATENT DOCUMENTS

| 2004/0001072 | A1* | 1/2004 | Newman ........................ 345/593 |
| 2005/0047648 | A1* | 3/2005 | Newman et al. ............... 382/162 |
| 2007/0230777 | A1* | 10/2007 | Tamagawa ..................... 382/162 |
| 2009/0251485 | A1* | 10/2009 | Peiro et al. .................... 345/593 |

FOREIGN PATENT DOCUMENTS

| JP | 07107314 A | 4/1995 |
| JP | 2000-217007 A | 8/2000 |
| JP | 2002-152535 A | 5/2002 |
| JP | 2005-084932 A | 3/2005 |

OTHER PUBLICATIONS

Rejection of the Application, dated Sep. 17, 2013, issued in corresponding JP Application No. 2010-164094, 10 pages in English and Japanese.

* cited by examiner

*Primary Examiner* — Benny Q Tieu
*Assistant Examiner* — Marcellus Augustin
(74) *Attorney, Agent, or Firm* — Sughrue Mion, PLLC

(57) ABSTRACT

It is determined whether an entered designated color is a color within a gamut of a printing machine or not. If the designated color is judged as being not a color within the gamut, then the designated color is mapped to converted colors within the gamut according to a plurality of gamut mapping processes. One of the gamut mapping processes which corresponds to one of the converted colors is selected. If the designated color is judged as being a color within the gamut, the designated color is set as a reference color. If the designated color is judged as being not a color within the gamut, then the selected one of the converted colors is set as the reference color.

17 Claims, 21 Drawing Sheets

FIG. 9

RECOMMENDED PRINT MEDIUM DISPLAY SCREEN — 280

PRINTING MACHINE NAME: PRINTER-1 — 282

PRINT MEDIUM ATTRIBUTE: ALL REFLECTIVE PRINT MEDIUMS — 284

DISPLAY ITEMS: ◉ RECOMMENDED ONLY (286a)   ○ ALL (286b)

DISPLAY ORDER: ◉ GAMUT DISTANCE (288a)   ○ PRINT MEDIUM ATTRIBUTE (288b)

| PRINT MEDIUM ATTRIBUTE | PRINT MEDIUM ITEM | DISTANCE UP TO GAMUT BOUNDARY |
|---|---|---|
| VINYL CHLORIDE | A100 | 9.5 |
| VINYL CHLORIDE | B235 | 8.7 |
| SYNTHETIC PAPER | P036 | 8.2 |
| SYNTHETIC PAPER | P170 | 7.5 |
| TARPAULIN | T150 | 6.9 |
| VINYL CHLORIDE | B190 | 6.4 |
| SYNTHETIC PAPER | K3000 | 5.7 |
| VINYL CHLORIDE | A200 | 5.5 |

290 / 294 / 295 / 296 / 298

292 — RETURN

FIG. 13

COLOR SELECTING METHOD, IMAGE PROCESSING METHOD, IMAGE PROCESSING APPARATUS, AND COMPUTER-READABLE RECORDING MEDIUM STORING PROGRAM

CROSS-REFERENCE TO RELATED APPLICATION

This application is based upon and claims the benefit of priority from Japanese Patent Applications No. 2009-218211 filed on Sep. 19, 2009, No. 2010-007263 filed on Jan. 15, 2010 and No. 2010-164094 filed on Jul. 21, 2010, of which the contents are incorporated herein by reference.

BACKGROUND OF THE INVENTION

1. Field of the Invention

The present invention relates to a color selecting method, an image processing method, an image processing apparatus, and a computer-readable recording medium storing a program, for printing a color chart having a plurality of color patches of a reference color and colors close to the reference color with a printing machine, and selecting, from the color chart, one of the color patches which is closest to a designated color.

2. Description of the Related Art

With significant advances in inkjet technology in recent years, it has become possible for inkjet printers to produce large color prints of high quality at high speeds. Inkjet printers are not only popular for private or home use, but nowadays also are widely used in commercial applications. Inkjet printers make it possible to print on POP (point of purchase) posters, wall posters, large-size mediums such as outdoor advertisements and billboards, roll mediums, and thick hard mediums.

There are a wide variety of print mediums (hereinafter also referred to as "mediums") available for use in prints to meet various commercial demands. For example, such print mediums include paper mediums, such as synthetic paper, thick paper, aluminum-evaporated paper, etc., resin mediums such as those made of vinyl chloride, PET, etc., and tarpaulin paper made of woven fiber cloth with synthetic resin films applied to both surfaces thereof.

Since advertisement prints are expected to be effective to arouse consumers' motivation to buy advertised products through visual sensations of the consumer, the color finish of such prints is of particular importance. Heretofore, there have been disclosed various color matching technologies, such as a method of generating an ICC (International Color Consortium) profile, a method of adjusting a designated color, etc., as a print color managing means. Such color matching technologies are applicable not only to inkjet printers but also to all types of digital printers, including those based on electrophotographic and thermosensitive principles, together with their peripheral devices across the board.

The method of adjusting a designated color referred to above comprises a method of making fine color adjustments of an area of interest in an image in order to bring the color into substantial conformity with a given color (designated color) designated by a color sample of color chips, while maintaining the color balance of the image as a whole. There have been disclosed various methods of adjusting a designated color.

For example, Japanese Laid-Open Patent Publication No. 2000-217007 discloses a method of bringing the impression of a designated color displayed on a display device and the impression of a color printed by a printing machine into conformity with each other. Specifically, Japanese Laid-Open Patent Publication No. 2000-217007 discloses a display window displayed on the display device, in which the displayed color is changeable, and a printed color chart of 27 colors, which are thought to be close to a designated color that is displayed (see FIGS. 4 and 5 of Japanese Laid-Open Patent Publication No. 2000-217007).

The operator sets a designated color that is to be displayed in the display window, presses a print button to print the color chart on the printing machine, selects one of the 27 colors of the color chart, which is closest to the designated color, and enters the number of the closest color into the display device, for thereby strictly approximating the impression of the designated color displayed in the display window by the impression of the color printed on the printing machine.

If the designated color falls within the range of the gamut of the printing machine, then no significant problem arises because at least colors in the neighborhood of the designated color can be reproduced.

On the other hand, if the designated color falls outside the range of the gamut, it is physically impossible to reproduce the designated color. In such a case, the designated color is replaced with a certain color within the gamut, i.e., a color that is closest to the designated color, and a gamut mapping process is carried out taking into account the color balance of the overall image. For determining the certain color, the definition of the "color that is closest to the designated color" is clarified to determine the directionality of an optimum color, and a gamut mapping process (hereinafter also referred to as "mapping process") is selected.

For example, Japanese Laid-Open Patent Publication No. 2005-084932 discloses a method of and an apparatus for mapping a designated color that falls outside the gamut onto a color within the gamut based on the result of an analysis of the color taste of the operator.

Japanese Laid-Open Patent Publication No. 2002-152535 discloses a method of and an apparatus for changing a mapping process based on an evaluation function depending on the distance up to the gamut if a certain color is judged as a color outside the gamut by a gamut inside/outside determining section.

However, there are instances where even the methods and apparatus disclosed in Japanese Laid-Open Patent Publication No. 2000-217007, Japanese Laid-Open Patent Publication No. 2005-084932, and Japanese Laid-Open Patent Publication No. 2002-152535 fail to select a color that is acceptable by the operator and the client.

According to Japanese Laid-Open Patent Publication No. 2000-217007, when a color chart is to be initially printed, the operator often selects a color (one of 27 colors) corresponding to the designated color by intuition. A color that falls within the gamut but is near its boundary, is highly nonlinear. Reproduction of such a color is difficult to predict, and the color tends to be reproduced with reduced accuracy. If an initial value cannot appropriately be selected, the process of printing and visually checking a color chart has to be repeated many times.

According to Japanese Laid-Open Patent Publication No. 2005-084932 (see FIG. 2 thereof), it is not necessarily clear to the operator how the result of the selection of a color patch is analyzed and reflected. According to Japanese Laid-Open Patent Publication No. 2002-152535, the tendency of a color adjustment based on the evaluation function and the mapping process is not necessarily clear to the operator. Consequently, when the designated color is adjusted, the operator is liable to become more anxious about the possibility not to reach a color that is closest to the designated color as the number of times that a color chart is reprinted increases.

SUMMARY OF THE INVENTION

It is an object of the present invention to provide a color selecting method, an image processing method, an image processing apparatus, and a computer-readable recording medium storing a program, which are capable of efficiently selecting a color within a gamut in such a manner that the operator is acceptable even if the designated color falls outside the gamut.

According to the present invention, there is provided a color selecting method of printing a color chart having a plurality of color patches of a reference color and colors close to the reference color with a printing machine and selecting one of the color patches whose color is closest to a designated color from the color chart.

The color selecting method comprises an entering step of entering color values of the designated color, a determining step of determining whether the designated color whose color values are entered is a color within a gamut of the printing machine or not, a mapping step of mapping the designated color to converted colors within the gamut according to a plurality of gamut mapping processes, if the designated color is judged as being not a color within the gamut, a selecting step of selecting one of the converted colors, and a setting step of setting the designated color as the reference color if the designated color is judged as being a color within the gamut, and setting the selected one of the converted colors as the reference color if the designated color is judged as being not a color within the gamut.

Preferably, the gamut mapping processes include a process for employing a different gamut mapping process depending on a color range of the designated color.

Preferably, the color selecting method further comprises a displaying step of displaying the converted colors as a plurality of candidate colors.

Preferably, the gamut mapping processes include a process for employing a different gamut mapping process depending on a color range of the designated color.

Preferably, the determining step further determines whether or not the designated color is a color near a boundary of the gamut, the color selecting method further comprising a warning step of issuing a warning if the designated color is judged as being a color near the boundary of the gamut.

Preferably, the warning step issues a warning if the designated color is judged as being a color within the gamut, and if the designated color is judged as being a color near the boundary of the gamut.

Preferably, the color selecting method further comprises a second determining step of determining whether the designated color whose color values are entered is a color within a gamut of each print medium or not, and a second displaying step of displaying the result of whether the designated color is a color within the gamut of each print medium or not, for each print medium.

Preferably, the second displaying step displays only information about a print medium with respect to which the designated color is judged as being a color within the gamut.

According to the present invention, there is also provided a color selecting method of printing a color chart having a plurality of color patches of a reference color and colors close to the reference color, with a printing machine and selecting one of the color patches whose color is closest to a designated color from the color chart, comprising an entering step of entering color values of the designated color, a determining step of determining whether the designated color whose color values are entered is a color within a gamut of the printing machine or not, a selecting step of selecting one of a plurality of gamut mapping processes if the designated color is judged as being not a color within the gamut, a mapping step of mapping the designated color to a converted color within the gamut according to the selected one of the gamut mapping processes, and a setting step of setting the converted color as the reference color.

According to the present invention, there is also provided an image processing method comprising an entering step of entering color values of a designated color to be reproduced by a printing machine, a determining step of determining whether the designated color whose color values are entered is a color within a gamut of the printing machine or not, a mapping step of mapping the designated color to converted colors within the gamut according to a plurality of gamut mapping processes, if the designated color is judged as being not a color within the gamut, a selecting step of selecting one of the converted colors, a setting step of setting the designated color as a reference color if the designated color is judged as being a color within the gamut, and setting the selected one of the converted colors as the reference color if the designated color is judged as being not a color within the gamut, a printing step of printing a color chart having a plurality of color patches of the set reference color and colors close to the set reference color with the printing machine, a first acquiring step of acquiring color values depending on one of the color patches which is selected from the printed color chart as representing a color that is closest to the designated color, as first color values, a second acquiring step of acquiring color values of the designated color as second color values, and a correcting step of correcting a profile of the printing machine based on the acquired first color values and second color values.

According to the present invention, there is also provided an image processing method comprising an entering step of entering color values of a designated color to be reproduced by a printing machine, a determined step of determining whether the designated color whose color values are entered is a color within a gamut of the printing machine or not, a mapping step of mapping the designated color to converted colors within the gamut according to a plurality of gamut mapping processes, if the designated color is judged as being not a color within the gamut, a selecting step of selecting one of the converted colors, a setting step of setting the designated color as a reference color if the designated color is judged as being a color within the gamut, and setting the selected one of the converted colors as the reference color if the designated color is judged as being not a color within the gamut, a printing step of printing a color chart having a plurality of color patches of the set reference color and colors close to the set reference color with the printing machine, an acquiring step of acquiring color values depending on one of the color patches which is selected from the printed color chart as representing a color that is closest to the designated color, as selected color values, a converting step of converting the acquired selected color values into device-depending data according to a target profile, and a displaying step of displaying at least one of the device-depending data and the acquired selected color values.

According to the present invention, there is further provided an image processing apparatus comprising an input device for entering color values of a designated color to be reproduced by a printing machine, a determining section for determining whether the designated color whose color values are entered by the input device is a color within a gamut of the printing machine or not, a mapping section for mapping the designated color to converted colors within the gamut according to a plurality of gamut mapping processes, if the designated color is judged as being not a color within the gamut by the determining section, a selector for selecting one of the converted colors obtained by mapping with the mapping section, a setter for setting the designated color as a reference color if the designated color is judged as being a color within the gamut, and setting the one of the converted colors selected by the selector, as the reference color if the designated color is judged as being not a color within the gamut, a print controller for controlling a printing machine to print a color chart having a plurality of color patches of the reference color set by the setter and colors close to the set reference color, a first acquisition section for acquiring color values depending on one of the color patches which is selected from the printed color chart as representing a color that is closest to the designated color, as first color values, a second acquisition section for acquiring color values of the designated color as second color values, and a corrector for correcting a profile of the printing machine based on the acquired first color values and second color values.

According to the present invention, there is further provided an image processing apparatus comprising an input device for entering color values of a designated color to be reproduced by a printing machine, a gamut inside/outside determining section for determining whether the designated color whose color values are entered by the input device is a color within a gamut of the printing machine or not, a mapping section for mapping the designated color to converted colors within the gamut according to a plurality of gamut mapping processes, if the designated color is judged as being not a color within the gamut by the gamut inside/outside determining section, a selector for selecting one of the converted colors obtained by mapping with the mapping section, a setter for setting the designated color as a reference color if the designated color is judged as being a color within the gamut, and setting the one of the converted colors selected by the selector, as the reference color if the designated color is judged as being not a color within the gamut, a print controller for controlling the printing machine to print a color chart having a plurality of color patches of the reference color and colors close to the reference color, an acquisition section for acquiring color values depending on one of the color patches which is selected from the printed color chart as representing a color that is closest to the designated color, as selected color values, a data converter for converting the selected color values acquired by the acquisition section into device-depending data according to a target profile, and a display device for displaying at least one of the device-depending data obtained by conversion by the data converter and the acquired selected color values.

According to the present invention, there is also provided a computer-readable recording medium storing a program for enabling a computer to perform the functions of entering color values of a designated color to be reproduced by a printing machine, determining whether the designated color whose color values are entered is a color within a gamut of the printing machine or not, mapping the designated color to converted colors within the gamut according to a plurality of gamut mapping processes, if the designated color is judged as being not a color within the gamut, selecting one of the converted colors, setting the designated color as a reference color if the designated color is judged as being a color within the gamut, and setting the selected one of the converted colors as the reference color if the designated color is judged as being not a color within the gamut, generating image data of a color chart having a plurality of color patches of the set reference color and colors close to the set reference color, and controlling the printing machine to print the color chart based on the generated image data.

With the color selecting method, the image processing method, the image processing apparatus, and the program according to the present invention, color values of a designated color are entered, and it is determined whether the designated color whose color values are entered is a color within a gamut of a printing machine or not. If the designated color is judged as being not a color within the gamut, then the designated color is mapped to converted colors within the gamut according to a plurality of gamut mapping processes. One of the converted colors is selected. If the designated color is judged as being a color within the gamut, the designated color is set as a reference color. If the designated color is judged as being not a color within the gamut, then the selected one of the converted colors is set as the reference color. It is therefore easy for the operator to visually confirm the colors on the display screen of a display monitor or the like. Even if the designated color is a color outside the gamut, the operator is capable of efficiently selecting a color within the gamut in such a manner that the operator is acceptable.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 9 is a view showing, by way of example, a screen for displaying the types of recommended print mediums according to the embodiment;

FIG. 13 is a diagram showing, by way of example, design values of the colors of color patches on a designated color adjusting color chart;

DESCRIPTION OF THE PREFERRED EMBODIMENTS

Color selecting methods according to preferred embodiments of the present invention in relation to an image processing apparatus, and a printing system for carrying out the color selecting methods, will be described in detail below with reference to the accompanying drawings.

Figure 1:
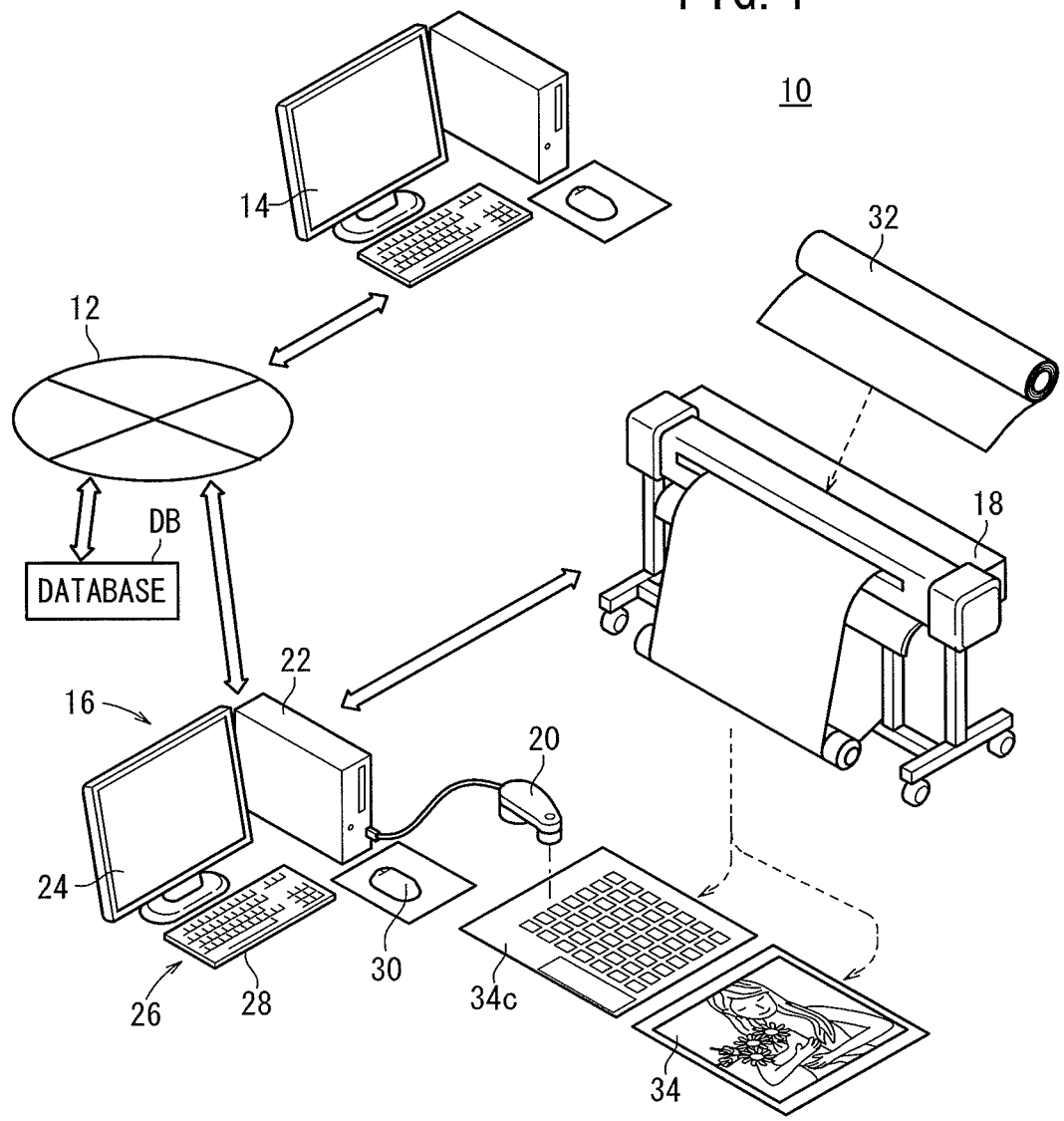
FIG. 1 is a perspective view of a printing system incorporating an image processing apparatus according to an embodiment of the present invention.

FIG. 1 shows in perspective a printing system 10 incorporating an image processing apparatus 16 according to an embodiment of the present invention.

As shown in FIG. 1, the printing system 10 basically comprises a LAN 12, an editing apparatus 14, an image processing apparatus 16, a printing machine 18, and a colorimeter 20.

The LAN 12 makes up a network constructed according to communication standards such as Ethernet (registered trademark) or the like. The editing apparatus 14 and the image processing apparatus 16 are connected to each other and also to a database DB through the LAN 12 by a wired or a wireless link.

The editing apparatus 14 is capable of editing the arrangement of color images made up of characters, figures, pictures, photos, etc., on each of pages to be printed. The editing apparatus 14 generates electronic manuscripts in a page description language (hereinafter referred to as "PDL"), e.g., 8-bit image data in color channels of four colors (C, M, Y, K) or three colors (R, G, B).

PDL refers to a language, which is descriptive of image information including format information, positional information, color information (including density information), etc., of characters, figures, etc., in a "page" that serves as an output unit for printing, displaying, or the like. Known types of PDL include PDF (Portable Document Format according to ISO32000-1:2008), PostScript (registered trademark) of Adobe Systems, and XPS (XML Paper Specification).

A color scanner, not shown, is connected to the editing apparatus 14. The color scanner is capable of optically reading a color original set in position. Therefore, the editing apparatus 14 can acquire color image data from the color scanner, based on the color original read thereby, as the image data of an electronic manuscript.

The image processing apparatus 16 converts the color image data of an electronic manuscript described by PDL and acquired from the editing apparatus 14 into raster image data (e.g., bitmap image data), performs a desired image processing process, e.g., a color conversion process, an image scaling process, an image arranging process, etc., on the bitmap image data, converts the processed bitmap image data into a print control signal that matches the printing process of the printing machine 18, and sends the print control signal to the printing machine 18.

The image processing apparatus 16 comprises a main unit 22, including a CPU, a memory, etc., a display device 24 for displaying color images, and an input device 26 serving as an input unit and including a keyboard 28 and a mouse 30. The colorimeter 20 is connected to the main unit 22 of the image processing apparatus 16.

The printing machine 18 comprises an inkjet printing apparatus for producing a color image based on a combination of standard inks of colors C, M, Y, K (process colors), together with optional inks of light colors, such as LC, LM, etc. and W (white). The printing machine 18 controls the propulsion of inks onto a print medium 32 (rolled non-printed medium in FIG. 1), based on a print control signal received from an external apparatus, e.g., the image processing apparatus 16, in order to print a color image on the print medium 32, thereby producing a print 34, which may include a designated color adjusting color chart 34c.

The print medium 32 may comprise a paper medium such as synthetic paper, thick paper, aluminum-evaporated paper, or the like, a resin medium such as vinyl chloride, PET, or the like, or tarpaulin paper, etc.

The colorimeter 20 measures colorimetric values of an object to be measured. Such colorimetric values refer not only to tristimulus values X, Y, Z and the coordinates L*, a*, b* of a uniform color space, etc., but also the characteristics of optical physical values with respect to wavelengths, e.g., a spectral radiance distribution, a spectral sensitivity distribution, a spectral reflectivity, or a spectral transmittance.

Figure 2:
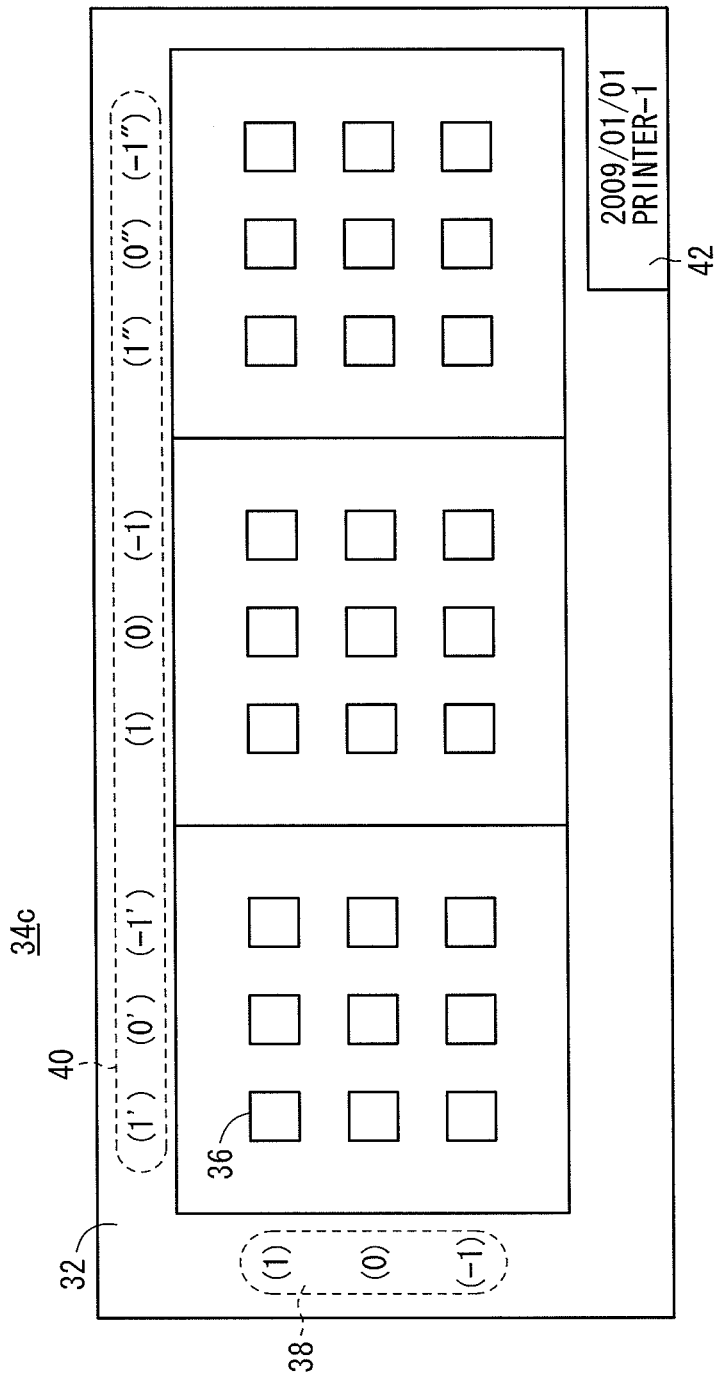
FIG. 2 is a front elevational view of a designated color adjusting color chart according to the embodiment.

FIG. 2 is a front elevational view of a designated color adjusting color chart 34c.

As shown in FIG. 2, the designated color adjusting color chart 34c comprises 27 color patches 36 made up of different colors, which are substantially identical in shape, row numbers 38 and column numbers 40 for identifying the positions of the color patches 36 along the directions of rows and columns, and print information 42 for identifying conditions for printing the color chart 34c, all of which are printed on the print medium 32.

The color patches 36 are arranged in three matrices disposed respectively in left, central, and right areas of the print medium 32, each matrix having three vertical columns and three horizontal rows. The color patches 36 are spaced from each other by given intervals. Colors of the respective color patches 36 are set to given values in a range of signal levels of C, M, Y, K values (a percentage range from 0% to 100% or an 8-bit gradation range from 0 to 255).

The row numbers 38, which serve as identification information, represent a vertical string of characters (1), (0), (−1) positioned in alignment with and to the left of the respective rows of the color patches 36. The column numbers 40, which also serve as identification information, represent a horizontal string of characters (1'), (0'), (−1'), (1), (0), (−1), (1"), (0"), (−1") positioned in alignment with and at the top of the respective columns of the color patches 36.

The print information 42 is printed in the color chart 34c, representing the type and serial number or registered name of the printing machine 18, a print mode to be described later, the type of the print medium 32, a print date, etc.

Figure 3:
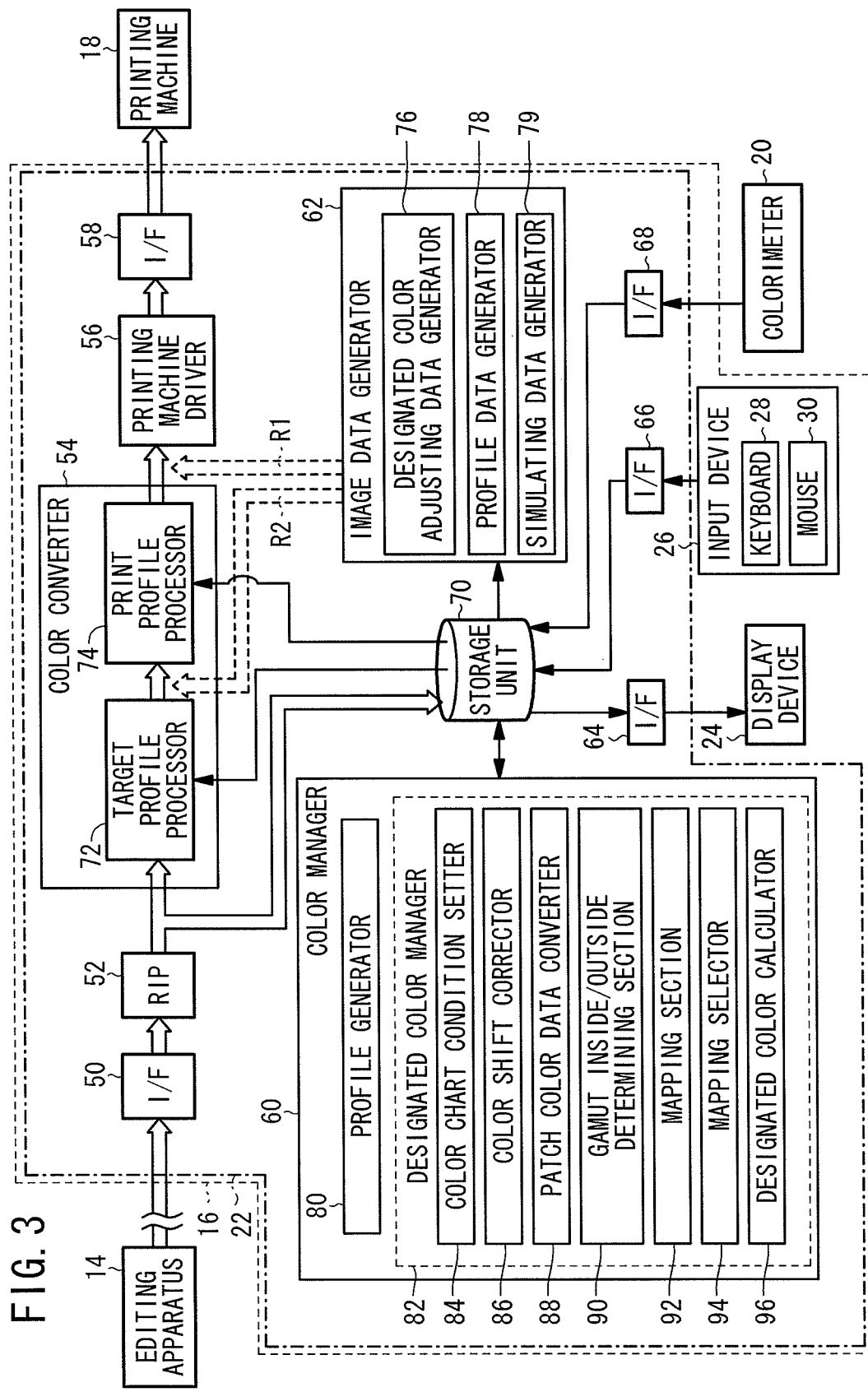
FIG. 3 is a functional block diagram of the image processing apparatus according to the embodiment.

FIG. 3 shows in block form the image processing apparatus 16 according to the present embodiment. In FIG. 3, an electronic manuscript is supplied along directions indicated by the outlined solid-line arrows, color-chart image data is supplied along directions indicated by the outlined broken-line arrows, and various other data is supplied along directions indicated by the solid-line arrows.

As shown in FIG. 3, the main unit 22 of the image processing apparatus 16 includes an I/F 50 for entering an electronic manuscript supplied from the editing apparatus 14, a RIP (Raster Imaging Processor) 52 for converting the PDL format of the electronic manuscript supplied from the I/F 50 into a raster format, a color converter 54 for performing a color converting process on the converted C, M, Y, K values (or R, G, B values) of the electronic manuscript from the RIP 52 in order to produce image data made up of new C, M, Y, K values, a printing machine driver (print controller) 56 for converting the image data of the new C, M, Y, K values produced by the color converter 54 into a print control signal (ink propulsion control data) that matches the printing process of the printing machine 18, and an I/F 58 for outputting the print control signal generated by the printing machine driver 56 to the printing machine 18.

The main unit 22 also includes a color manager 60 for managing profiles of different printing machines 18, an image data generator 62 for generating image data to print the designated color adjusting color chart 34c or a profile color chart, not shown, an I/F 64 connected to the display device 24, an I/F 66 connected to the input device 26 including the keyboard 28 and the mouse 30, and an I/F 68 connected to the colorimeter 20.

The main unit 22 also includes a storage unit 70 for storing various data supplied from various components of the main unit 22, and for supplying stored data to various components of the main unit 22. The storage unit 70 is connected to the RIP 52, the color converter 54, the color manager 60, the image data generator 62, the I/F 64, the I/F 66, and the I/F 68.

The color converter 54 comprises a target profile processor 72 for converting device-dependent data into device-independent data, and a print profile processor 74 for converting device-independent data into device-dependent data. Device-dependent data refer to data defined in terms of C, M, Y, K values, R, G, B values, or the like, for appropriately driving various devices. Device-independent data refer to data defined in terms of a color system, such as an HSL system, an HSB system, a CIELAB coordinate system, a CIELUV coordinate system, an XYZ system, or the like.

The image data generator 62 comprises a designated color adjusting data generator 76 for generating image data to print the designated color adjusting color chart 34c, a profile data generator 78 for generating image data to print the profile color chart, not shown, and a simulating data generator 79 for generating image data which simulate the positions of the color patches 36 on the designated color adjusting color chart 34c.

The color manager 60 comprises a profile generator (corrector) 80 for generating and correcting profiles for respective printing machines 18, and a designated color manager 82 for managing designated colors for the respective printing machines 18. The designated color refers to a color designated by a color sample of color chips or the like in order to be reproduced on the print 34 by the printing machine 18.

The designated color manager 82 comprises a color chart condition setter (setter) 84 for setting color chart conditions (reference colors, color difference intervals, the number of color patches 36, and a gamut mapping process) to be described later, a color shift corrector 86 for correcting shifts of color values of the printing machine 18, a patch color data converter (acquisition section, first acquisition section, data converter) 88 for acquiring the L*, a*, b* values (device-independent data) of a certain color patch and converting the acquired L*, a*, b* values into C, M, Y, K values (device-dependent data), a gamut inside/outside determining section (determining section) 90 for determining whether a certain color falls within the range of the gamut of an output device (including the printing machine 18), a mapping section 92 for color-converting a first gamut into a second gamut according to a plurality of gamut mapping algorithms (hereinafter referred to as "mapping processes"), a mapping selector (selector) 94 for selecting one of the mapping processes, and a designated color calculator 96 for calculating color values of a color corresponding to designated coordinates on a displayed simulating image of the designated color adjusting color chart 34c.

The RIP 52 can perform various image processing processes including an image scaling process depending on the resolution, etc., of the printing machine 18, and a rotating and inverting process depending on a printing format when an electronic manuscript is converted into raster image data.

The printing machine driver 56 generates ink propulsion control data corresponding to ink colors (C, M, Y, K, LC, LM, or W) from C, M, Y, K values. The ink propulsion control data are related to operational details of the printing machine 18, which ejects inks (ink ejection ON/OFF, ink dot diameters, etc.) according to data definitions inherent in the printing machine 18. The printing machine driver 56 may generate the ink propulsion control data according to a known algorithm, such as a dither matrix method, an error diffusion method, or the like, although it requires conversion from an 8-bit multiple-gradation image into a low-gradation image such as a binary image.

The target profile processor 72 or the print profile processor 74 is capable of correcting profiles depending on a print mode of the printing machine 18. The print mode refers to various print settings, such as the number of nozzles of the print head, the timing (unidirectional/bidirectional) of ink ejection during scanning of the print head, the number of passes, the number and type of inks used on the printing machine 18, the algorithm for generating ink ejection control data, etc.

The main unit 22 has a controller (not shown) comprising a CPU, etc., for controlling all of the image processing processes described above. More specifically, the controller controls not only operations of various components of the main unit 22, e.g., reading data from and writing data to the storage unit 70, but also transmission of display control signals via the I/F 64 to the display device 24, and acquisition of colorimetric data from the colorimeter 20 via the I/F 68.

The image processing apparatus 16 according to the present embodiment is constructed basically as described above. The image processing processes or functions described above can be performed, for example, according to application software (programs) stored in the storage unit 70, which operate according to basic software (operating system).

The programs may be recorded in a computer-readable recording medium, and may be read from the medium into a computer system and executed thereby. The term "computer system" includes an OS and hardware including peripheral devices. The computer-readable recording medium comprises a portable storage medium such as a flexible disk, a magnetooptical disk, a ROM, a CD-ROM, or the like, or a storage unit such as a hard disk or the like incorporated into the computer system. The computer-readable recording medium also includes a medium for dynamically holding programs for a short period of time, such as a communication line for transmitting programs via a network such as the Internet or the like or via a communication channel such as a telephone line, or a memory for holding programs for a certain period of time such as a volatile memory in a computer system which serves as a server or a client in a network environment.

Figure 4:
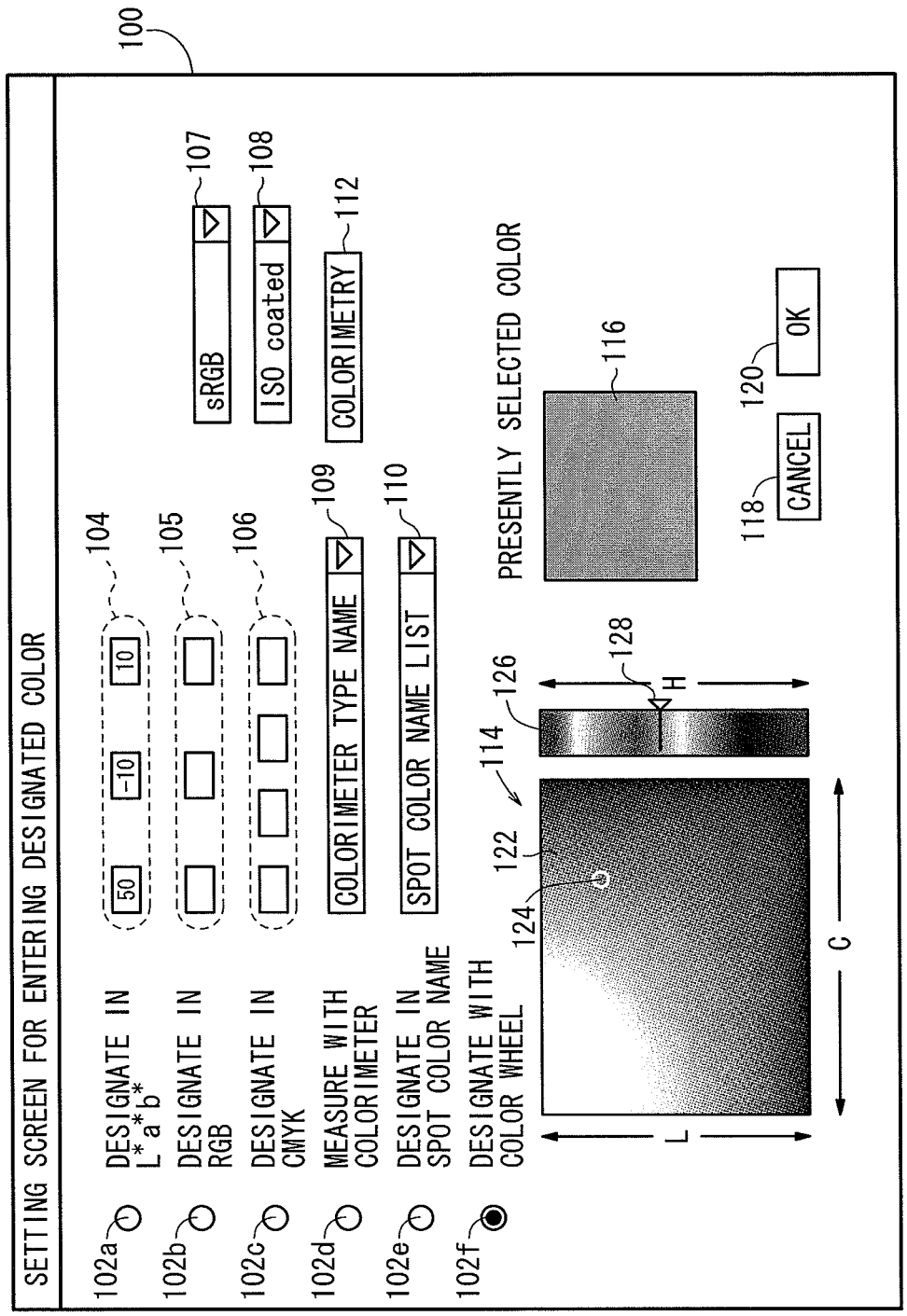
FIG. 4 is a view showing, by way of example, a setting screen for entering a designated color according to the embodiment.

FIG. 4 shows, by way of example, a setting screen displayed by the display device 24 for entering a designated color according to the embodiment.

As shown in FIG. 4, the setting screen, denoted by 100, includes six radio buttons 102a through 102f, three textboxes 104, three textboxes 105, four textboxes 106, two pull-down menus 107, 108, two pull-down menus 109, 110, a button 112 displaying "COLORIMETRY", a color wheel 114, a reference patch 116, and buttons 118, 120 displaying "CANCEL", "OK", respectively, which are arranged in the order from upper-left to lower-right of the setting screen 100.

The setting screen 100 also includes displayed messages "DESIGNATE IN L*a*b*", "DESIGNATE IN RGB", "DESIGNATE IN CMYK", "MEASURE WITH COLORIMETER", "DESIGNATE IN SPOT COLOR NAME", and "DESIGNATE WITH COLOR WHEEL" on the right sides of the radio buttons 102a through 102f respectively.

The operator can enter various characters including numbers into the three textboxes 104, the three textboxes 105, and the four textboxes 106, using the keyboard 28 (see FIG. 1).

The pull-down menu 107 is positioned on the right side of the three textboxes 105, and has a column displaying characters "sRGB". The pull-down menu 108 is positioned on the right side of the four textboxes 106, and has a column displaying characters "ISO coated".

The pull-down menus 109, 110 are positioned beneath the four textboxes 106, and have respective columns displaying characters "COLORIMTER TYPE NAME" and "SPOT COLOR LIST".

The color wheel 114 comprises a color pallet 122, an annular pointer 124, a color bar 126, and a triangular pointer 128.

The color pallet 122 is of a rectangular shape and displays continuously changing colors therein. A letter "L" and two arrows directed upwardly and downwardly are displayed on the left side of the color pallet 122. A letter "C" and two arrows directed to the left and right are displayed beneath the color pallet 122. The annular pointer 124 is displayed in the color pallet 122 (at an upper right position in FIG. 4), and is freely movable in the color pallet 122.

A vertically elongate color bar 126 which extends vertically is positioned on the right side of the color pallet 122. The color bar 126 displays a vertical range of continuously changing colors. The triangular pointer 128 is positioned on the right side of the color bar 126 and is freely movable vertically along the color bar 126.

The reference patch 116 which is rectangular in shape is positioned on the right side of the color wheel 114, and displays the same color as the color that is designated by the annular pointer 124.

Figure 5:
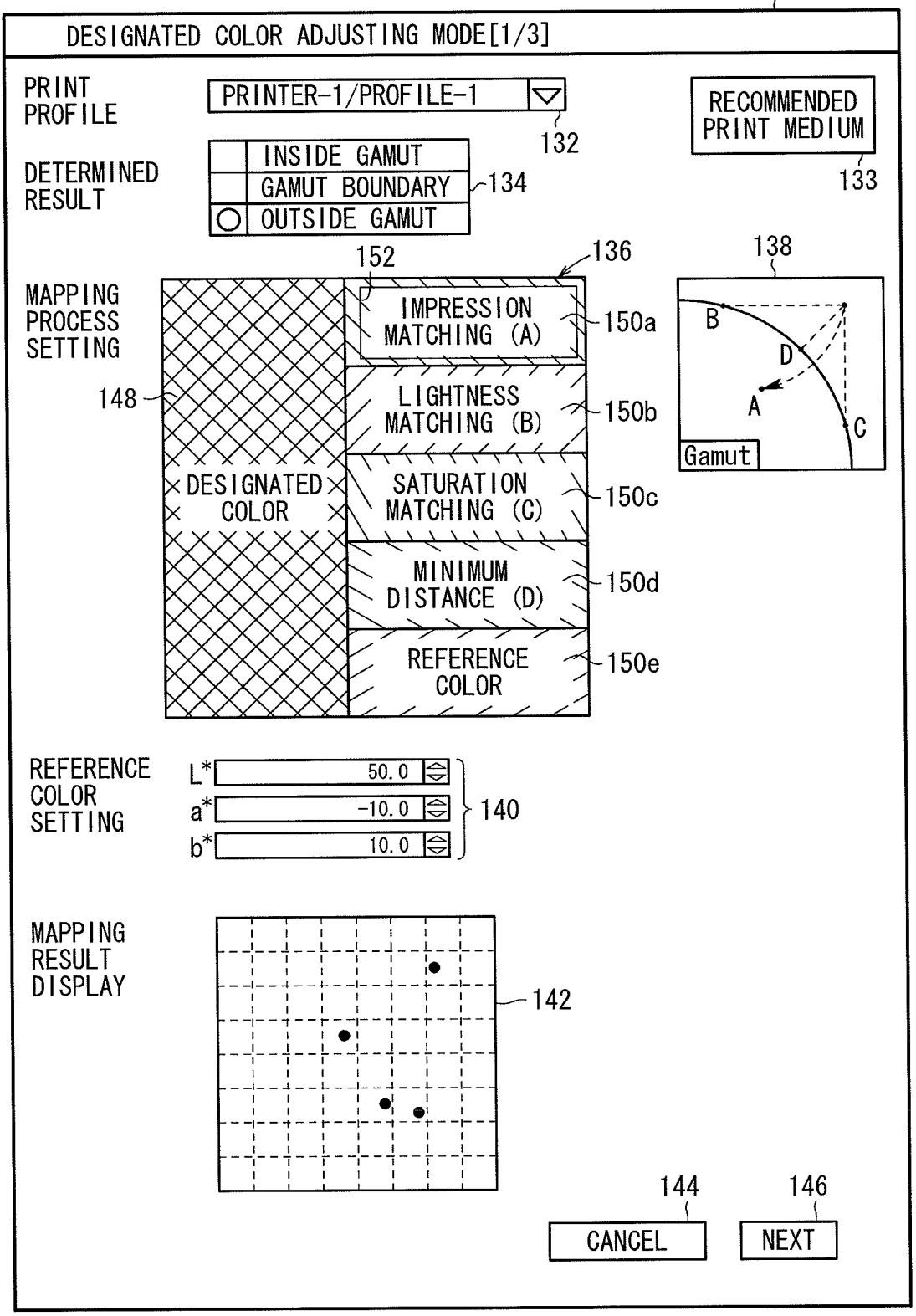
FIG. 5 is a view showing, by way of example, a first setting screen for adjusting a designated color according to the embodiment.

FIG. 5 shows, by way of example, a first setting screen displayed by the display device 24 for adjusting a designated color according to the embodiment.

As shown in FIG. 5, the first setting screen, denoted by 130, includes a pull-down menu 132, a button 133 displaying "RECOMMENDED PRINT MEDIUM", a display column 134, a color pallet 136, a graph 138, a vertical array of three textboxes 140 with spin buttons, a graph 142, and buttons 144, 146 displaying "CANCEL", "NEXT", respectively, which are arranged successively downwardly.

The first setting screen 130 also includes a string of letters "PRINT PROFILE" on the left side of the pull-down menu 132. The display column 134 includes a vertical array of columns displaying "INSIDE GAMUT", "GAMUT BOUNDARY", and "OUTSIDE GAMUT" that are arranged successively downwardly. The display column 134 also includes another vertical array of columns on the left sides of the above columns, and "◯" is displayed in the column on the left side of the column displaying "OUTSIDE GAMUT".

The color pallet 136 includes a color sample patch 148 displaying "DESIGNATED COLOR", candidate color patches 150a, 150b, 150c, 150d displaying "IMPRESSION MATCHING (A)", "LIGHTNESS MATCHING (B)", "SATURATION MATCHING (C)", "MINIMUM DISTANCE (D)" respectively, the candidate color patches 150a, 150b, 150c, 150d having respective colors approximated according to the corresponding matching, and a reference color patch 150e displaying "REFERENCE COLOR". The first setting screen 130 also includes a string of letters "MAPPING PROCESS SETTING" on the left side of the color pallet 136.

The three textboxes 140 with spin buttons allow the operator to change the L*, a*, b* of a reference color, to be described later, independently, by operating the keyboard 28 or the mouse 30 in a certain way.

Each of the graphs 138, 142 displays a cross-sectional representation of an L*a*b* space as a two-dimensional coordinate system (a coordinate system of L*-a* plane, a*-b* plane, or L*-b* plane). The two coordinate system contains several points plotted thereon.

Figure 6:
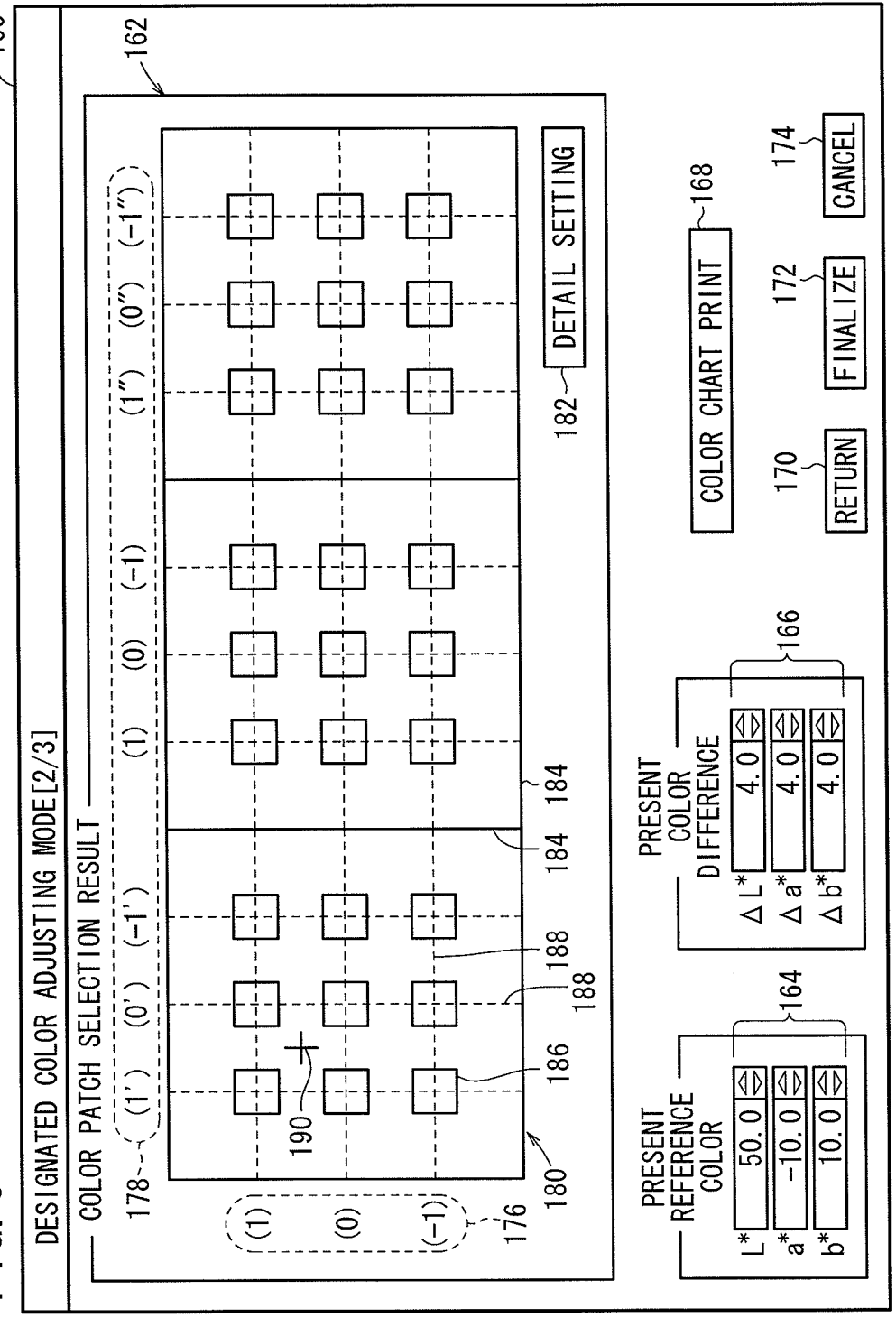
FIG. 6 is a view showing, by way of example, a second setting screen for adjusting a designated color according to the embodiment.

FIG. 6 shows, by way of example, a second setting screen displayed by the display device 24 for adjusting a designated color according to the embodiment.

As shown in FIG. 6, the second setting screen, denoted by 160, includes a patch selection image 162, two vertical arrays of textboxes 164, 166 with spin buttons, and buttons 168, 170, 172, 174 displaying "COLOR CHART PRINT", "RETURN", "FINALIZE", and "CANCEL", respectively, which are arranged successively downwardly.

The patch selection image 162 is an image representative of the contents of the designated color adjusting color chart 34c, and includes row numbers 176, column numbers 178, a matrix image 180, and a button 182 displaying "DETAIL SETTING".

The matrix image 180 comprises an outer frame 184 indicated by solid lines, 27 color patches 186, 12 auxiliary lines 188 indicated by broken lines, and a pointer 190 in the form of a criss cross.

The 12 auxiliary lines 188 are made up of nine vertical lines and three horizontal lines which are arranged in a grid pattern so as to pass through the centers of the color patches 186.

The two vertical arrays of textboxes 164, 166 with spin buttons allow the operator to change the color values (L*, a*, b*) of a reference color and the values of color difference intervals ($\Delta$L*, $\Delta$a*, $\Delta$b*) by operating the keyboard 28 or the mouse 30 in a certain way.

Figure 7:
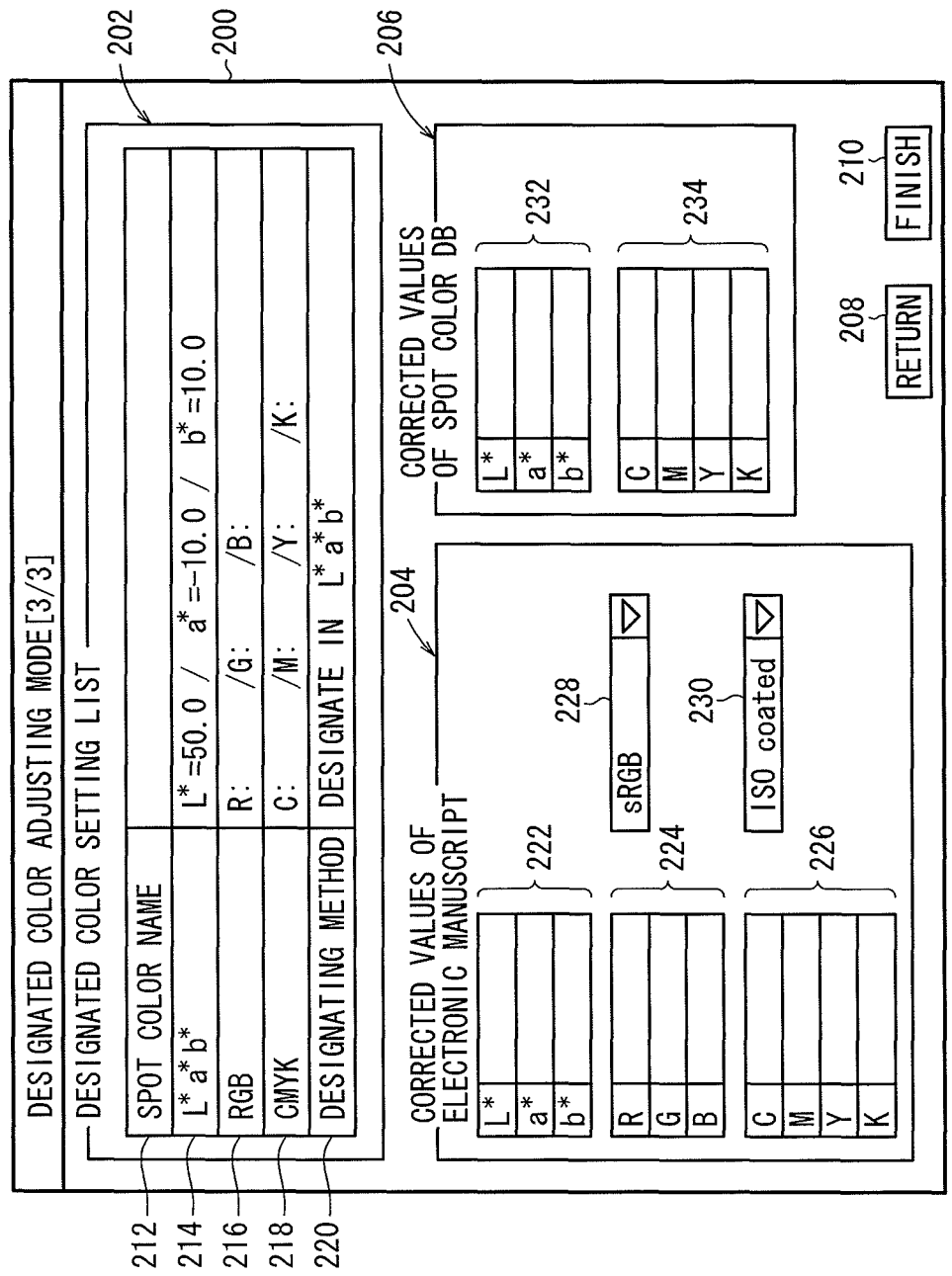
FIG. 7 is a view showing, by way of example, a third setting screen for adjusting a designated color according to the embodiment.

FIG. 7 shows by way of example a third setting screen displayed by the display device 24 for adjusting a designated color according to the present embodiment.

As shown in FIG. 7, the third setting screen, denoted by 200, includes a display column 202 displaying "DESIGNATED COLOR SETTING LIST", a display column 204 displaying "CORRECTED VALUES OF ELECTRONIC MANUSCRIPT", a display column 206 displaying "CORRECTED VALUES OF SPOT COLOR DB", and buttons 208, 210 displaying "RETURN", "FINISH", respectively, which are arranged successively downwardly.

The display column 202 comprises a column 212 for displaying a spot color name, a column 214 for displaying L*, a*, b* values, a column 216 for displaying R, G, B values, a column 218 for displaying C, M, Y, K values, and a column 220 for displaying a process of specifying color values.

The display column 204 comprises a column 222 displaying L*, a*, b* values, a column 224 displaying R, G, B values, a column 226 displaying C, M, Y, K values, a pull-down menu 228 for selecting a type of target profile where device-dependent data are of R, G, B values, and a pull-down menu 230 for selecting a type of target profile where device-dependent data are of C, M, Y, K values.

The display column 206 comprises a column 232 displaying L*, a*, b* values and a column 234 displaying C, M, Y, K values.

Figure 8:
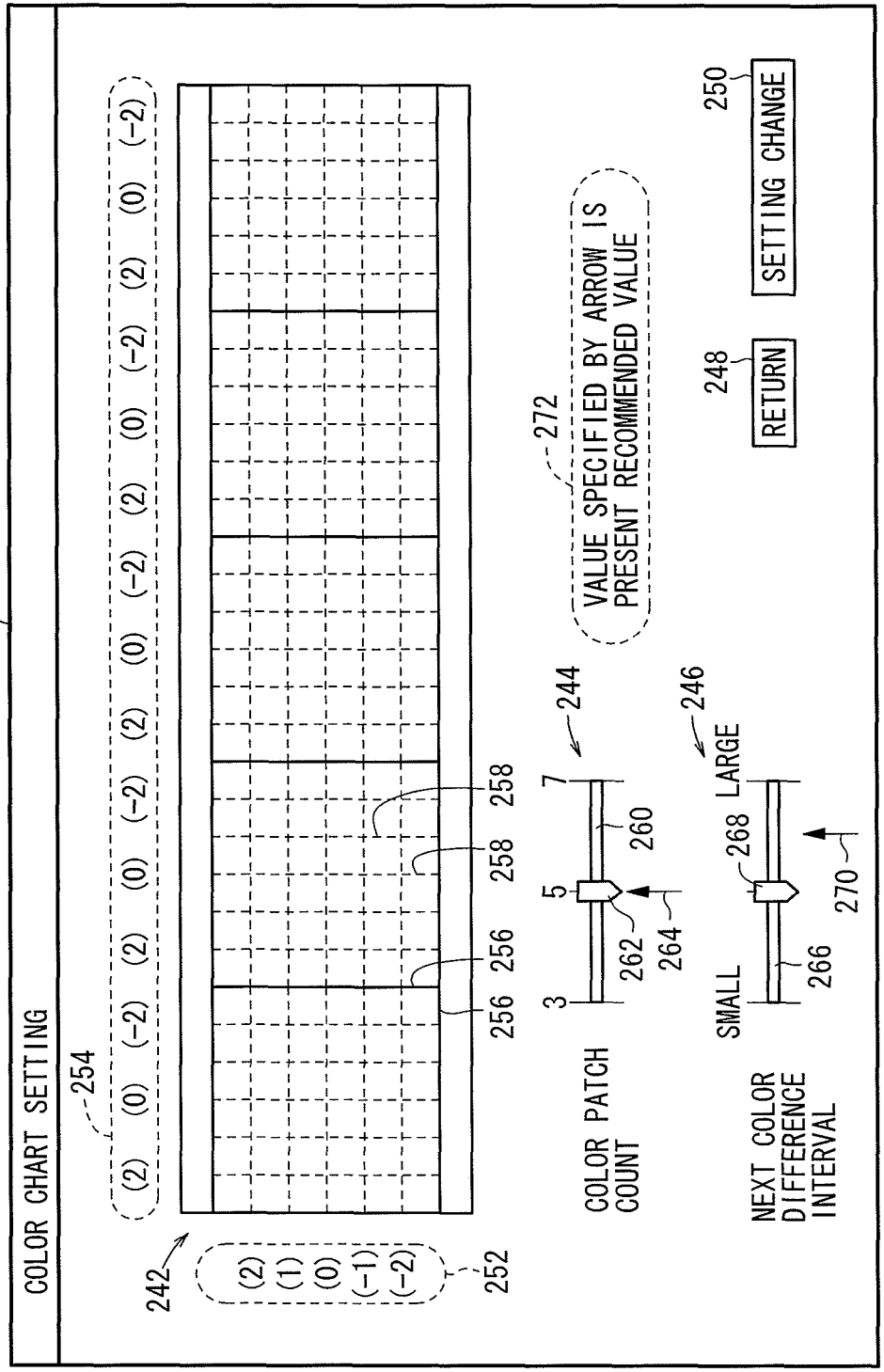
FIG. 8 is a view showing, by way of example, a setting screen for setting color chart conditions according to the embodiment.

FIG. 8 shows by way of example a setting screen displayed by the display device 24 for setting color chart conditions according to the present embodiment.

As shown in FIG. 8, the setting screen, denoted by 240, includes a patch selection image 242, slider bars 244, 246, and buttons 248, 250 displaying "RETURN", "SETTING CHANGE", respectively.

The patch selection image 242 has an appearance similar to the patch selection image 162 shown in FIG. 6. The patch selection image 242 includes row numbers 252, column numbers 254, an outer frame 256 indicated by solid lines, and 30 auxiliary lines 258 indicated by broken lines. The 30 auxiliary lines 258 are made up of 25 vertical lines and five horizontal lines which are arranged in a grid pattern.

The slider bar 244 comprises a gage 260 extending horizontally in the setting screen 240 and a slider 262 movable horizontally on and along the gage 260. The patch selection image 242 includes a string of letters "NUMBER OF COLOR PATCHES" on the left side of the left end of the gage 260, and an arrow 264 beneath the slider 262, pointing to the position of a scale mark "5".

The slider bar 246 comprises a gage 266 extending horizontally in the setting screen 240 and a slider 268 movable horizontally on and along the gage 266. The patch selection image 242 includes a string of letters "NEXT COLOR DIFFERENCE INTERVAL" on the left side of the left end of the gage 266, and an arrow 270 beneath the slider 268, pointing to a position near a scale mark "LARGE".

THE patch selection image 242 also includes a string 272 of letters "VALUE SPECIFIED BY ARROW IS PRESENT RECOMMENDATED VALUE".

FIG. 9 shows, by way of example, a screen displayed by the display device 24 for displaying the types of recommended print mediums 32 according to the present embodiment.

As shown in FIG. 9, the screen, denoted by 280, which serves as a confirmation image, includes pull-down menus 282, 284, two radio buttons 286a, 286b, two radio buttons 288a, 288b, a display column 290, and a button 292 displaying "RETURN", which are arranged successively downwardly.

The screen 280 also includes a string of letters "PRINTING MACHINE NAME" on the left side of the pull-down menu 282 and a string of letters "PRINT MEDIUM ATTRIBUTE" on the left side of the pull-down menu 284.

The screen 280 also includes a string of letters "DISPLAY ITEMS" on the left side of the radio button 286a, a string of letters "RECOMMENDED ONLY" on the right side of the radio button 286a, a string of letters "ALL" on the right side of the radio button 286b, a string of letters "DISPLAY ORDER" on the left side of the radio button 288a, a string of letters "GAMUT DISTANCE" on the right side of the radio button 288a, and a string of letters "PRINT MEDIUM ATTRIBUTE" on the right side of the radio button 288b.

The display column 290 comprises a column 294 for displaying "PRINT MEDIUM ATTRIBUTE", a column 295 for displaying "PRINT MEDIUM ITEM", a column 296 for displaying "DISTANCE UP TO GAMUT BOUNDARY", and a scroll bar 298 on the right side of the column 296. The display column 290 is capable of simultaneously displaying various information in eight rows (except for the heading in the uppermost row).

The printing system 10 according to the present embodiment is basically constructed as described above. Operations of the printing system 10 will be described below.

Figure 10:
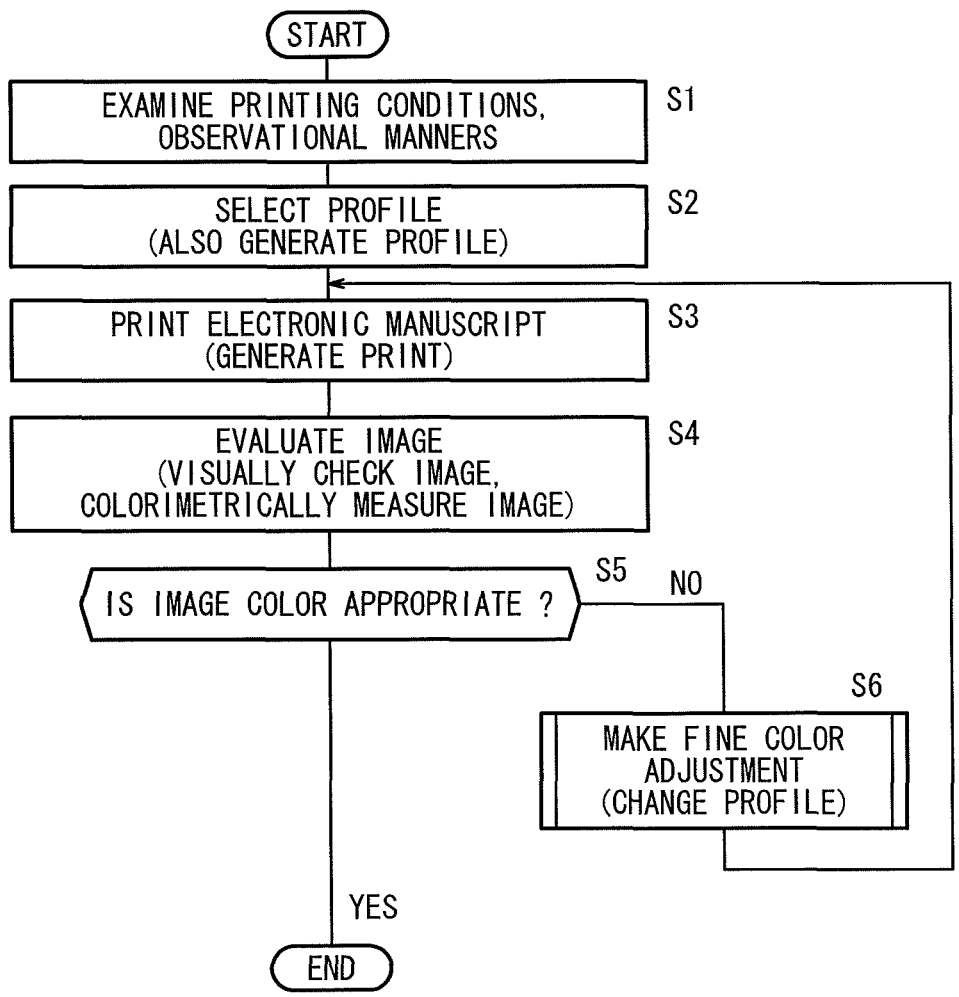
FIG. 10 is a flowchart of a sequence for producing a print of appropriate color with the printing system according to the embodiment.

FIG. 10 is a flowchart of a sequence for producing a print 34 of appropriate color with the printing system 10 according to the embodiment. Operation of the printing system 10 will be described in detail below with reference to the flowchart of FIG. 1.

An operator examines printing conditions and observational manners of a print 34 to be produced (step S1). The printing conditions refer to the type of the printing machine 18 that is used to produce the print 34, the type of the print medium 32, and the print mode described above. The observational manners refer to the attributes (type, spectral data) of an observational light source used for the print 34 and also the type of the image on the print 34 to be observed. The type of the image may represent a reflective image (an image generated using a reflective light source as a main light source), a transmissive image (an image generated using a transmissive light source as a main light source), or a mixed image (an image generated using reflective and transmissive light sources as main light sources).

Then, the operator selects a profile suitable for the printing machine 18 (step S2). Normally, a target profile or a print profile is stored in the storage unit 70. If a profile suitable for the printing machine 18 is not registered, i.e., is not stored in the storage unit 70, then a print profile can be generated separately.

Then, an electronic manuscript is printed using the printing machine 18, thereby producing a color print 34 (step S3). The print 34 may be laminated by a laminating apparatus, not shown, in order to provide a protective film over the image surface of the print 34. The color image of the print 34 can thus be protected so as to provide better abrasion resistance and toughness.

Then, the operator evaluates the color of the image of the print 34 (step S4), and determines whether or not the color of the image is appropriate (step S5). The operator may evaluate the color of the image so as to determine whether desired hues are obtained or not, either by visually checking the image based on the observation of an overall or partial appearance of the image, or by obtaining a colorimetric value of a certain area of the print 34 with the colorimeter 20, and thereby determining whether or not the obtained colorimetric value falls within a desired range.

According to the present embodiment, a designated color (a real color sample) is provided for a certain area of the color image, and the operator evaluates the color of the image by determining whether or not the color of the certain area of the color image essentially is the same as the designated color.

If, as a result of the image evaluation, the operator judges that the image of the print 34 is not suitable, then the operator changes the profile or the like in order to make fine adjustments of the color of the image (step S6). More specifically, the operator may correct color values of an electronic manuscript, the operator may reset or regenerate the profile, or the operator may make fine adjustments of the profile (i.e., correcting the presently selected profile).

Thereafter, an electronic manuscript is printed, and the color of the image thereof is evaluated repeatedly (steps S3 through S6) until a print 34 of desired color is obtained.

An image processing sequence of the image processing apparatus 16 for generating a profile (step S2) will be described in detail below with reference to FIG. 3.

Image data generated by the profile data generator 78 based on given C, M, Y, K value data stored in the storage unit 70 are supplied from the image data generator 62 via a path R1 to the printing machine driver 56, which converts the image data into a print control signal, i.e., ink ejection control data, which is supplied via the I/F 58 to the printing machine 18. Color patches of a profile color chart thus produced, not shown, are measured by the colorimeter 20, which is connected to the image processing apparatus 16, thereby producing color values L*, a*, b*. The color value data thus produced are temporarily stored in the storage unit 70. Thereafter, based on the associative relationship between the designated C, M, Y, K value data and the produced color values L*, a*, b*, the profile generator 80 generates a three-dimensional to four-dimensional conversion LUT and hence generates a print profile which includes data representing the LUT.

An image processing sequence of the image processing apparatus 16 for printing an electronic manuscript (step S3) will be described in detail below with reference to FIG. 3.

When an electronic manuscript in a PDL format supplied from the editing apparatus 14 is input to the image processing apparatus 16 via the LAN 12 and the I/F 50, the electronic manuscript is converted into 8-bit C, M, Y, K raster data (device-dependent image data) by the RIP 52. The 8-bit C, M, Y, K raster data then are converted into L*, a*, b* data (device-independent image data) by the target profile processor 72. The L*, a*, b* data then are converted into C, M, Y, K value data (device-dependent image data) by the print profile processor 74. The C, M, Y, K value data then are converted into a print control signal by the printing machine driver 56. The print control signal is supplied from the printing machine driver 56 via the I/F 58 to the printing machine 18. Thereafter, the printing machine 18 produces a desired print 34 based on the print control signal.

Target profiles and print profiles corresponding to a plurality of set conditions have been stored in the storage unit 70. A target profile and a print profile are selectively supplied to the target profile processor 72 and the print profile processor 74, depending on various preset conditions. If the profiles are appropriately corrected in view of the print mode of the printing machine 18, then a more appropriate color conversion process can be performed.

The flowchart shown in FIG. 10 for producing a print 34 of appropriate colors with the image processing method according to the present embodiment has been described above. The process of changing the profile will be described in detail below.

Figure 11:
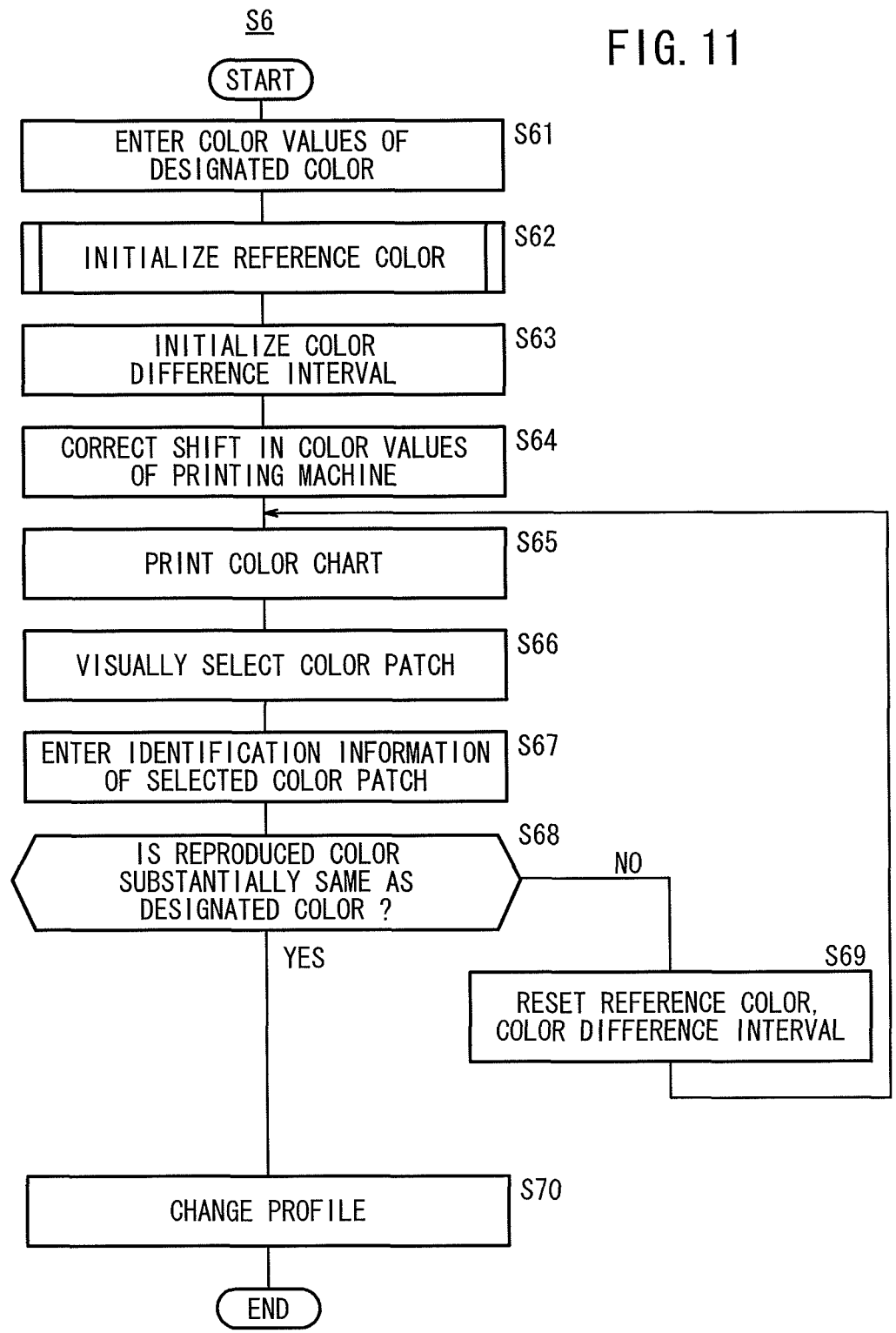
FIG. 11 is a flowchart of a profile changing process according to the embodiment.

FIG. 11 is a flowchart of a process of adjusting a designated color using the designated color adjusting color chart 34c (step S6).

As shown in FIG. 11, the operator enters the color values of a designated color (step S61).

Specifically, as shown in FIG. 4, the operator selects one of processes (six processes in FIG. 4) of entering the color values of a presented designated color, and clicks on one of the radio buttons 102a through 102f which corresponds to the selected process, in the setting screen 100, which is displayed by the display device 24 (see FIG. 1).

"DESIGNATE IN L*a*b*" at the radio button 102a refers to a process for directly entering the known L*, a*, b* values of a designated color. More specifically, the operator uses the keyboard 28 (see FIG. 1) to enter the color values L*, a*, b* into the three textboxes 104 successively from the left in the setting screen 100.

For example, the operator may measure a color sample of color chips or the like with an external colorimeter, not shown, not connected to the image processing apparatus 16, and may enter the measured L*, a*, b* values into the three textboxes 104.

"DESIGNATE IN RGB" at the radio button 102b refers to a process for directly entering the known R, G, B values of a designated color. More specifically, the operator uses the keyboard 28 (see FIG. 1) to enter the color values R, G, B into the three textboxes 105 successively from the left in the setting screen 100.

For example, if the operator knows the R, G, B values of a given designated color although the operator does not have an actual color sample, then the operator may directly enter the R, G, B values of the designated color.

The operator selects an appropriate target profile depending on the attributes of the data of an electronic manuscript, and sets the selected target profile using the pull-down menu 107. The R, G, B values entered into the three textboxes 105 are converted into L*, a*, b* values by an RGB to L*a*b* conversion formula which corresponds to the selected target profile ("sRGB" in FIG. 4).

"DESIGNATE IN CMYK" at the radio button 102c refers to a process for directly entering the known C, M, Y, K values of a designated color. More specifically, the operator uses the keyboard 28 (see FIG. 1) to enter the color values C, M, Y, K into the four textboxes 106 successively from the left in the setting screen 100.

For example, if the operator knows the C, M, Y, K values of a given designated color although the operator does not have an actual color sample, then the operator may directly enter the C, M, Y, K values of the designated color.

The operator selects an appropriate target profile depending on the attributes of the data of an electronic manuscript, and sets the selected target profile using the pull-down menu 108. The C, M, M, K values entered into the four textboxes 106 are converted into L*, a*, b* values by a CMKY to L*a*b* conversion formula which corresponds to the selected target profile ("ISO coated" in FIG. 4).

"MEASURE WITH COLORIMETER" at the radio button 102d refers to a process for measuring a color sample such as color chips or the like with the colorimeter 20 and entering the obtained L*, a*, b* values. More specifically, after having set a color sample such that it can be measured by the colorimeter 20, the operator clicks on the button 112 displaying "COLORIMETRY", and the color values obtained by the colorimeter 20 are automatically acquired via the I/F 68 by the image processing apparatus 16, and stored in the storage unit 70.

"DESIGNATE IN SPOT COLOR NAME" at the radio button 102e refers to a process for referencing a spot color name stored and managed in the storage unit 70 and the database DB and acquiring the color values L*, a*, b* corresponding to the spot color name.

"DESIGNATED WITH COLOR WHEEL" at the radio button 102f refers to a process for acquiring color values L*, a*, b* using the color wheel 114. More specifically, the operator moves the annular pointer 124 on the color pallet 122 by dragging the mouse 30 thereby to change designated colors with the chroma (C) as a variable on the horizontal scale and the lightness (L) as a variable on the vertical scale. The operator also moves the triangular pointer 128 vertically along the color bar 126 by dragging the mouse 30 thereby to change designated colors with the hue (H) as a variable.

If the operator moves the annular pointer 124 and the triangular pointer 128, the present designated values (LCH) are updated and converted into L*, a*, b* values. The L*, a*, b* values are then converted into R, G, B values according to the profile of the display device 24. Based on the R, G, B values, the display device 24 is energized to display a reference patch 116 on its screen.

If color values are entered according to the process selected using either one of the radio buttons 102a through 102f, the entered color values are reflected in the values specified by the annular pointer 124 and the triangular pointer 128 on the color wheel 114. The operator can further finely adjust the entered color values by observing and comparing the color displayed in the reference patch 116 and the actual color sample.

After having selected one of the six processes and having entered the information about the designated color, the operator clicks on the button 120 displaying "OK". Then, the entered color values of the designated color are stored in the storage unit 70. If the operator clicks on the button 118 displaying "CANCEL", then the process of entering a designated color is cancelled.

Figure 12:
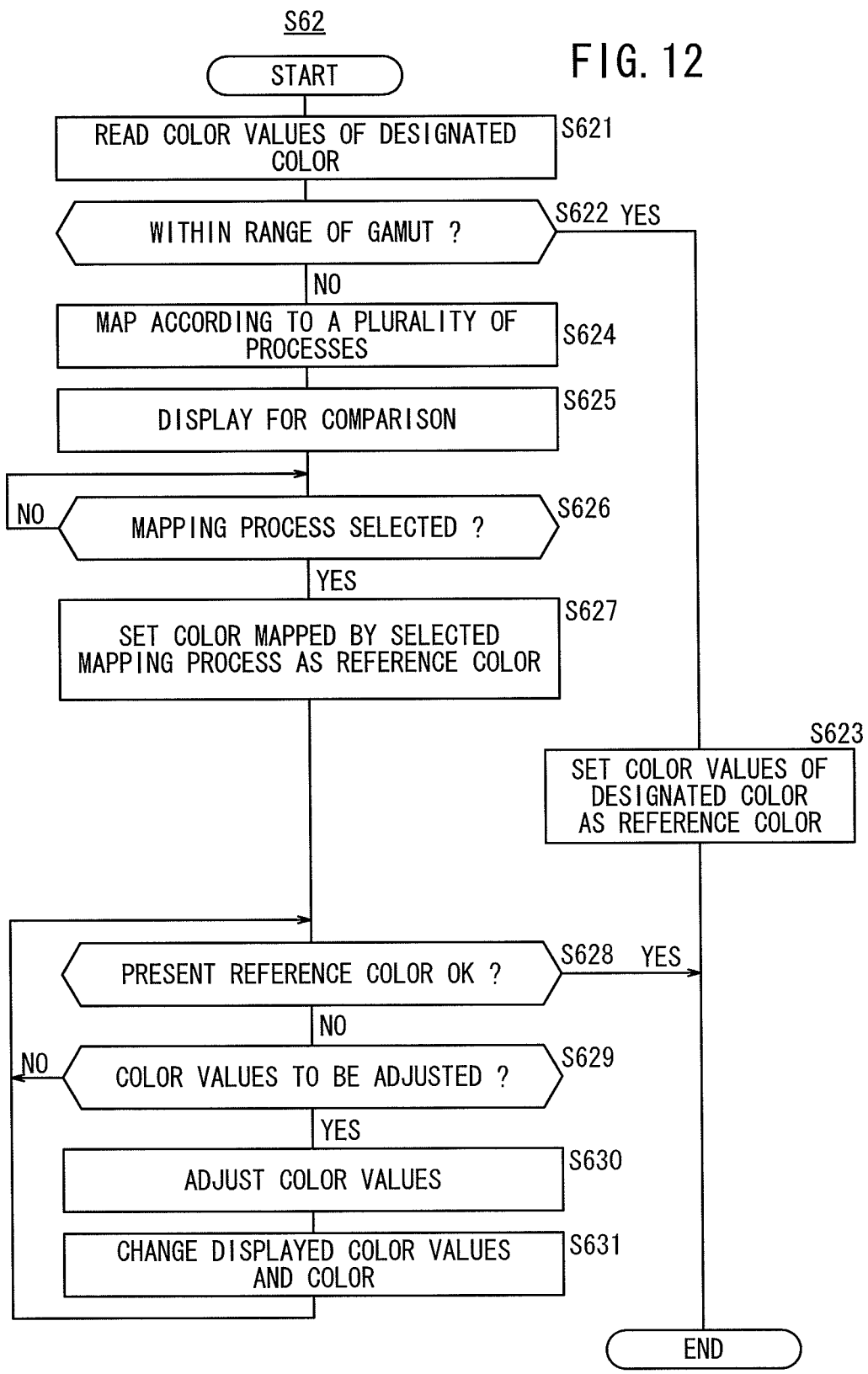
FIG. 12 is a flowchart of a process of setting initial values of a reference color according to the embodiment.

Thereafter, the operator sets initial values of a reference color (step S62). A process of setting initial values of a reference color will be described below with reference to a flowchart shown in FIG. 12.

First, the color values of the designated color are read (step S621). The color values to be read are L*, a*, b* values that are set from the setting screen 100 (see FIG. 4) and are stored in the storage unit 70.

Then, the gamut inside/outside determining section 90 determines whether the read L*, a*, b* values fall within or outside the gamut of the printing machine 18 (step S622).

The operator selects the type of the combination of the printing machine 18 and the print medium 32 to make a color adjustment, using the pull-down menu 132 in the setting screen 130 shown in FIG. 5. Based on the selected type of the combination of the printing machine 18 and the print medium 32, a print profile stored in the storage unit 70 is acquired.

If the type of the print medium 32 to be used is predetermined, then the operator may select the predetermined type of the print medium 32. However, if there are many types of print mediums 32 that can be used, then the operator that is unfamiliar with the printing characteristics of each print medium 32 may find it difficult to select one from the types of print mediums 32. In this case, a recommended print medium 32 may be displayed in another screen.

The operator clicks on the button 133 displaying "RECOMMENDED PRINT MEDIUM" on the right side of the pull-down menu 132. The setting screen 130 now changes to the confirmation screen 280 shown in FIG. 9.

The operator then selects the name of the printing machine 18 to be actually used to produce the print 34, using the pull-down menu 282 in the confirmation screen 280. Then, the operator selects the attribute of a print medium 32 to be extracted as a candidate, using the pull-down menu 284. In FIG. 9, "ALL REFLECTIVE PRINT MEDIUMS" are selected, and hence all print mediums 32 for printing a reflective image are extracted as candidates. Other print medium attributes include "ALL TRANSMISSIVE PRINT MEDIUMS" for extracting all print mediums 32 for printing a transmissive image, "VINYL CHLORIDE PRINT MEDIUMS" for extracting all print mediums 32 whose bases are made of polyvinyl chloride, and "ALL" for extracting all print mediums 32.

The operator alternatively selects "RECOMMENDED ONLY" or "ALL" using the radio button 286a or 286b for the display items of print mediums 32. If the operator selects "RECOMMENDED ONLY" using the radio button 286a, then all print mediums 32 that satisfy recommended conditions, of the group of print mediums 32 extracted using the pull-down menu 284, are displayed in the display column 290. If the operator selects "ALL" using the radio button 286b, then all the group of print mediums 32 extracted by the pull-down menu 284 are displayed in the display column 290.

Various recommended conditions may be set up. According to the present embodiment, the recommended condition is that an entered designated color is a color within the gamut.

The operator then alternatively selects "GAMUT DISTANCE" or "PRINT MEDIUM ATTRIBUTE" using the radio button 288a or 288b for the display order of print mediums 32. If the operator selects "GAMUT DISTANCE" using the radio button 288a, then print mediums 32 are displayed in descending order of distance Δe (hereinafter referred to as "gamut distance") between the color values of the designated color and the gamut boundary of the print mediums 32. In the gamut distance, a color within the gamut is defined as being positive, a color on the gamut boundary as being nil, and a color outside the gamut as being negative. In this case, a color within the gamut has a greater value as the color is remoter from the gamut boundary, whereas a color outside the gamut has a smaller value (a greater absolute value) as the color is remoter from the gamut boundary. If the operator selects "PRINT MEDIUM ATTRIBUTE" using the radio button 288b, then print mediums 32 are displayed in the column 294 in a certain order of "PRINT MEDIUM ATTRIBUTE" (e.g., an alphabetical order).

At the same time that the printing machine 18 and other properties are selected, the gamut inside/outside determining section 90 acquires print profiles of the print mediums 32 and determines whether the designated color falls within the gamut of each print medium 32 or not.

In FIG. 9, "PRINTER-1" is selected by the pull-down menu 282, "ALL REFLECTIVE PRINT MEDIUMS" by the pull-down menu 284, "RECOMMENDED ONLY" by the radio button 286a, and "GAMUT DISTANCE" by the radio button 288a. Therefore, only the information as to the print mediums 32 that have positive gamut distance values when "ALL REFLECTIVE PRINT MEDIUMS" are printed using the printing machine 18 of "PRINTER-1", is displayed in the display column 290 in descending order of gamut distance.

In the display column 290, for example, the print medium attributes are displayed in the column 294, the print medium items are displayed in the columns 295, and the values of gamut distances Δe of the print mediums 32 displayed in the column 295 are displayed in the columns 296. If the number of the print mediums 32 displayed in the display column 290 exceeds 8, then the other mediums 32 can be displayed in the display column 290 by vertically moving the scroll bar 298.

The fact that a designated color is a color outside the gamut may be indicated by a sign (minus) or a change in the color of letters or columns. If print mediums 32 which are not recommended are displayed in the display column 290 together with print mediums 32 which are recommended, then the display column of the print mediums 32 which are not recommended may be hatched so that the not-recommended print mediums 32 are distinguishable from the recommended print mediums 32.

After having confirmed the types of the print mediums 32 which are recommended, the operator clicks on the button 292 displaying "RETURN" on the right side of the display column 290. The confirmation screen 280 then changes back to the setting screen 130 shown in FIG. 5.

After having selected the type of a print profile, the gamut inside/outside determining section 90 (see FIG. 3) determines whether the set reference color belongs to the gamut of the printing machine 18 or not, using the color conversion LUT of the print profile. "Whether a color belongs to the gamut of the printing machine 18 or not" represents an attribute indicating whether the color is a color within the gamut or not.

If it is judged that the reference color is a color within the gamut, then "○" is displayed in the column on the left side of the column displaying "INSIDE GAMUT" in the display column 134 (see FIG. 5).

After having confirmed that the reference color falls within the gamut from the display column 134, then the operator clicks on the button 146 displaying "NEXT". Then, the color values of the designated color are set as the reference color (step S623).

According to the present embodiment, the gamut inside/outside determining section 90 determines not only whether a color is a color within the gamut or not, but also whether a color within the gamut is near the gamut boundary or not. If a color within the gamut is near the gamut boundary, then "○" is displayed in another column on the left side of the column displaying "INSIDE GAMUT" in the display column 134.

If it is judged that the reference color is a color outside the gamut, then the designated color is mapped according to a plurality of mapping processes (step S624). More specifically, the mapping section 92 maps the color values to a color within the range of the gamut according to a mapping process based on impression matching, a mapping process based on lightness matching, a mapping process based on saturation matching, and a mapping process based on minimum distance. The mapped color will hereinafter be referred to as "a converted color".

The color values of each converted color which has been mapped are supplied from the mapping section 92 to the storage unit 70, and then stored in the storage unit 70.

The mapping section 92 may map the color values according to processes other than the above mapping processes, and do not need to map the color values according to all the four mapping processes referred to above. The mapping section 92 has only to map the color outside the gamut which has been acquired, to a color within the gamut according to a plurality of mapping processes.

Then, the display device 24 simultaneously displays for comparison the designated color and the mapped converted colors in positions adjacent thereto (step S625). The backgrounds of the candidate color patches 150a through 150d shown in FIG. 5 are displayed in the converted colors mapped according to the various mapping processes.

The background of the vertically elongate color sample patch 148 in the color pallet 136 is displayed in the designated color. The designated color shown in FIG. 5 is the color entered in the setting screen 100 (see FIG. 4) and not changed in subsequent color adjusting operations.

The background of the reference color patch 150e is displayed in the reference color. The reference color shown in FIG. 5 is a color that is presently set as a reference and can be changed freely by resetting.

The mapping process based on "IMPRESSION MATCHING", the mapping process based on "LIGHTNESS MATCHING", the mapping process based on "SATURATION MATCHING", and the mapping process based on "MINIMUM DISTANCE" are applied respectively to the candidate color patches 150a, 150b, 150c, 150d. Specific details of the mapping processes will be described later.

Since the designated color as an initial reference color, the present reference color, and the colors produced by mapping the designated color are displayed at adjacent positions in the same screen, the operator finds it easy to compare the colors with each other, thereby helping the operator select a mapping process.

The graph 138 displays the conceptual diagrams of the mapping processes. In the graph 138, the results of the mapping of the designated color in a uniform color space are associated with respective points plotted in the graph 138. As the operator can sufficiently understand the mapping processes and the tendency of the color conversion according to the mapping processes by visually checking the graph 138, the operator feels satisfied about the color adjusting operation.

The operator selects a mapping process which has produced a color that is closest to the designated color or a mapping process which has produced a color close to a desired color.

If the operator selects one (e.g., the mapping process based on lightness matching) of the plural mapping processes (four mapping processes in FIG. 5) and clicks on the candidate color patch 150b corresponding to the selected matching process using the mouse 30, a selection frame 152 is selectively established around the candidate color patch 150b.

The gamut inside/outside determining section 90 determines whether any one of the mapping processes has been selected or not (step S626). If the gamut inside/outside determining section 90 judges that no mapping process has been selected, then control repeats step S626 until a mapping process is selected. If the gamut inside/outside determining section 90 judges that a mapping process has been selected in step S626, then the gamut inside/outside determining section 90 sets the converted color mapped by the selected mapping process as a reference color (step S627).

If the set reference color is judged as being OK, then the operator clicks on the button 146 displaying "NEXT" (step S628).

It is determined whether the color values need to be adjusted or not (step S629). If the color values need to be adjusted, then the color values are adjusted (step S630).

The operator can independently adjust the color values $L^*$, $a^*$, $b^*$ using the three textboxes 140 with spin buttons. Each time each of the color values $L^*$, $a^*$, $b^*$ is updated, the color values and the color which are displayed are changed (step S631).

For appropriately displaying the colors of the color pallet 136 on the display device 24, it is preferable to convert the colors using the display profile of the display device 24 which is stored in the storage unit 70 and then display the designated color, etc. on the display device 24.

As the color values of the designated color have already been set, they may be used as a reference color. However, the operator can finely adjust a preset reference color ($L^*_0$, $a^*_0$, $b^*_0$) by referring to the graph 142, which is positioned in a lower portion of the setting screen 130 for the purpose of further increasing the efficiency of the color adjustment.

The reference color can be finely adjusted by the three textboxes 140 with spin buttons. The three textboxes 140 with spin buttons display the color values of the designated color which have already been set in the setting screen 100 (see FIG. 4). The operator can finely adjust the values of the reference color by directly entering values into the three textboxes 140 using the keyboard 28 (see FIG. 1) or operating the spin buttons using the mouse 30 (see FIG. 1).

The graph 142 displays points of color plotted on a uniform color space. The four plotted points shown in the graph 142 correspond to the four mapping processes referred to above. If the values of the reference color are changed, they are immediately reflected in the positions of the points plotted on the graph 142.

The graph 142 may display not only a cross section of the gamut, but also a surface of the gamut in a two-dimensional fashion. The four plotted points may be displayed in different colors depending on the mapping processes. Therefore, the operator can visually recognize how the mapping processes are associated with the colors mapped by the mapping processes.

The set values of the reference color may be changed not only by the configuration shown in FIG. 5, but also by various GUI configurations including slider bars, color wheels, etc.

Then, the color difference interval of the designated color adjusting color chart 34c is initialized (step S63). Appropriate values may be set as initial values of the color difference interval (ΔL*, Δa*, Δb*) according to empirical rules about the color adjusting operation. The color difference interval may be changed in an initial stage depending on preferences of the operator.

In this manner, the reference color ($L^*_0$, $a^*_0$, $b^*_0$) and the color difference interval (ΔL*, Δa*, Δb*) are initialized (steps S62, S63). These values are acquired through the GUI by the image processing apparatus 16, stored in the storage unit 70, and set by the color chart condition setter 84 (see FIG. 3).

After having entered the reference color, the operator clicks on the button 146 displaying "NEXT". The setting screen 130 now changes to the second setting screen 160 shown in FIG. 6.

Then, a shift of the color values of the printing machine 18 is corrected (step S64). It is assumed that the colorimeter 20 produces measured values (L*(meas), a*(meas), b*(meas)) of a certain color patch 36 whose color has designed values (L*(des), a*(des), b*(des)). At this time, corrective amounts L*(diff), a*(diff), b*(diff) are calculated according to the following equations (1) through (3):

$$L^*(\text{diff}) = L^*(\text{meas}) - L^*(\text{des}) \quad (1)$$

$$a^*(\text{diff}) = a^*(\text{meas}) - b^*(\text{des}) \quad (2)$$

$$b^*(\text{diff}) = b^*(\text{meas}) - b^*(\text{des}) \quad (3)$$

When the image data are generated, the corrective amounts L*(diff), a*(diff), b*(diff) are added to the designed values of the colors for thereby correcting a slight shift in the print color in order to achieve an increase in color reproduction accuracy. In the correcting process, the print 34 may incorporate a designated color adjusting color chart 34c to be printed subsequently.

The values of the corrective amounts are temporarily stored in the storage unit 70. Thereafter, the corrective amounts are supplied to the color shift corrector 86 (see FIG. 3), which produces an appropriate print profile where the color shift of the print colors has been corrected.

Then, the designated color adjusting color chart 34c is printed (step S65).

According to one process of determining colors for placing a plurality of color patches 36 of different colors in a two-dimensional pattern, three variables (L*, a*, b*) of the uniform color space CIELAB are gradually changed at each of the positions of the color patches 36. More specifically, pixel values corresponding to the respective color patches 36 may be determined according to the following equations (4) through (6):

$$L^*_i = L^*_0 + \Delta L^* \times i \; (i \text{ represents an integer}) \quad (4)$$

$$a^*_j = a^*_0 + \Delta a^* \times j \; (j \text{ represents an integer}) \quad (5)$$

$$b^*_k = b^*_0 + \Delta b^* \times k \; (k \text{ represents an integer}) \quad (6)$$

The reference color corresponds to a color represented by ($L^*_o$, $a^*_o$, $b^*_o$), and the color difference interval corresponds to (ΔL*, Δa*, Δb*). Furthermore, a color area formed by the color patches 36 of the designated color adjusting color chart 34c will be referred to as a presentation area.

Figure 13:
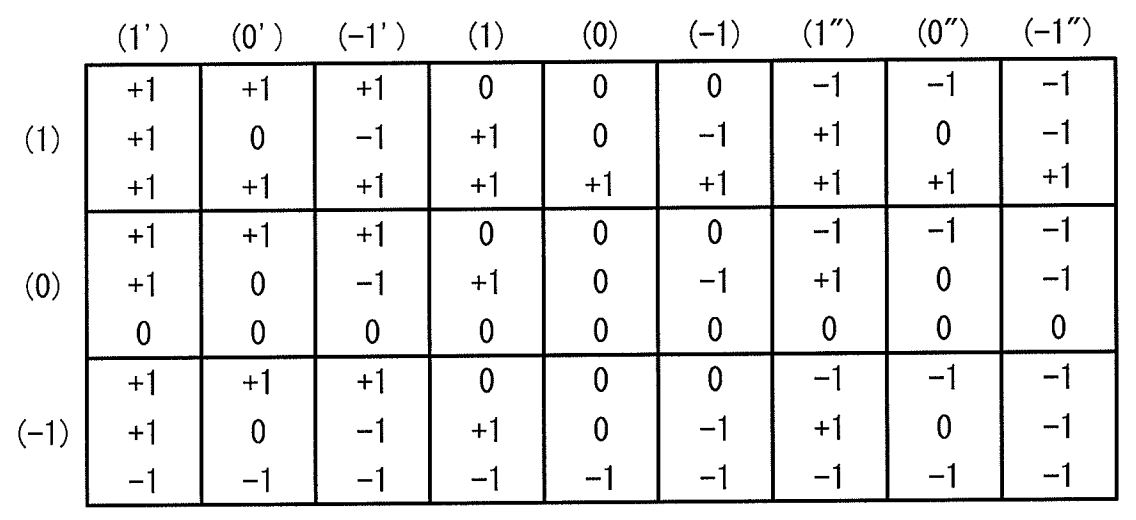

FIG. 13 shows by way of example design values of the colors of the color patches 36 on the designated color adjusting color chart 34c shown in FIG. 2. The numbers shown on the left side of and above the table of FIG. 13 correspond respectively to the row numbers 38 and the column numbers 40. The upper, middle, and lower numbers in each of the frames of the table represent values of "i" in the equation (4), values of "j" in the equation (5), and values of "k" in the equation (6), respectively.

The designated color adjusting data generator 76 (see FIG. 3) generates image data such that the color differences between adjacent color patches 36 are at a substantially equal interval. The reference color and the color difference interval can be provided by reading data that are preset by the color chart condition setter 84 and stored in the storage unit 70.

Image data generated by the designated color adjusting data generator 76 are supplied via a path R2 to the print profile processor 74 as shown in FIG. 3. The image data are supplied from the print profile processor 74 to the printing machine 18, in the same manner as when an electronic manuscript is printed. Color patches 36 of the designated color adjusting color chart 34c (see FIG. 2) substantially reproduce the preset color (L*, a*, b*).

The image data used to print the designated color adjusting color chart 34c are not limited to raster image data such as TIFF or bitmap data, but may be PDL-format image data such as PDF or PostScript (registered trademark) data.

The principles of operation of the image processing apparatus 16 for printing the designated color adjusting color chart 34c are the same as those for printing a profile color chart, not shown, and will not be described below.

Then, the operator selects one of the color patches 36 of the printed designated color adjusting color chart 34c (step S66). More specifically, the operator visually compares a color sample representing a designated color serving as a target represented by a color chip, or a color displayed by the display device 24, with the designated color adjusting color chart 34c, and selects one of the color patches 36, the color of which is closest to the designated color.

Since, when the operator visually observes the designated color adjusting color chart 34c, the operator visually recognizes colors of the color patches 36 as they change at substantially equal intervals, the operator can easily select a color patch 36, the color of which is closest to the designated color.

The operator may select one color patch 36 if its color is highly close to the designated color, or may select a color patch 36 intermediate among four adjacent color patches 36. If the designated color does not correspond to any of the colors presented by the 27 color patches 36, then the operator may select it as falling outside the designated color adjusting color chart 34c.

Alternatively, the operator may directly measure each of the color patches 36 with the colorimeter 20 and select the color patch 36 whose color is closest to the designated color based on the measured colorimetric values.

In FIG. 11, the operator enters identification information of the selected color patch 36 (step S67). More specifically, the operator enters, using the input device 26, values (see FIG. 2) represented by the row number 38 and the column number 40 which correspond to the position of the selected color patch 36.

The entered identification information of the color patch 36 is not limited to the information about the position of the color patch 36, but may be color information thereof. The color information refers to various information for specifying colors and includes not only an actual color sample but also its color values or type. The color values of a color sample include device-independent data or device-dependent data. The type of a color sample includes the manufacturer's name, the color sample number, etc.

The predetermined number of color patches 36 and the values of the color difference intervals are supplied to the simulating data generator 79, which generates image data simulating the layout of the color patches 36 on the designated color adjusting color chart 34c. The generated image data are sent via the I/F 64 to the display device 24, which displays a matrix image 180 (see FIG. 6) based on the supplied image data. When the operator clicks on any position in the matrix image 180 using the mouse 30 (see FIG. 1), the pointer 190 is placed in the corresponding position.

Then, a selected color can be presented with a resolution higher than the physical interval between the color patches 36, i.e., the color difference interval ($\Delta L^*$, $\Delta a^*$, $\Delta b^*$), due to the relative positional relationship between each color patch 186 displayed as part of the matrix image 180 and the pointer 190. The designated color calculator 96 (see FIG. 3) calculates color values (selected color values) corresponding to the position of the pointer 190 from the position of the pointer 190. An example of the calculation will be described below.

Figure 14B:
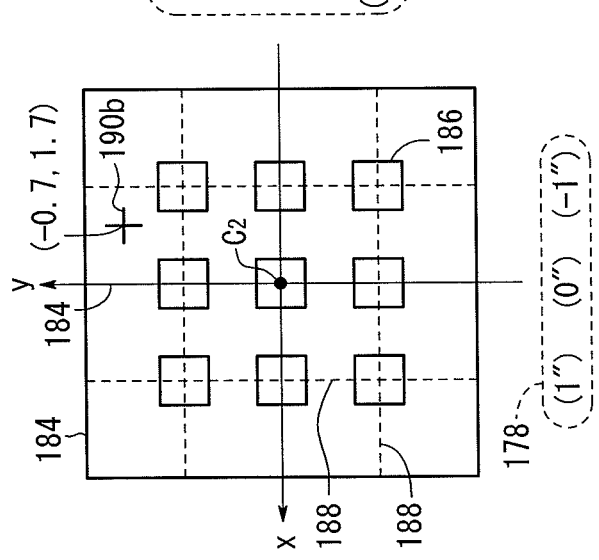
FIGS. 14A and 14B are partial enlarged views of a patch selection image at the time a certain color is selected by a pointer shown in FIG. 6.
Figure 14A:
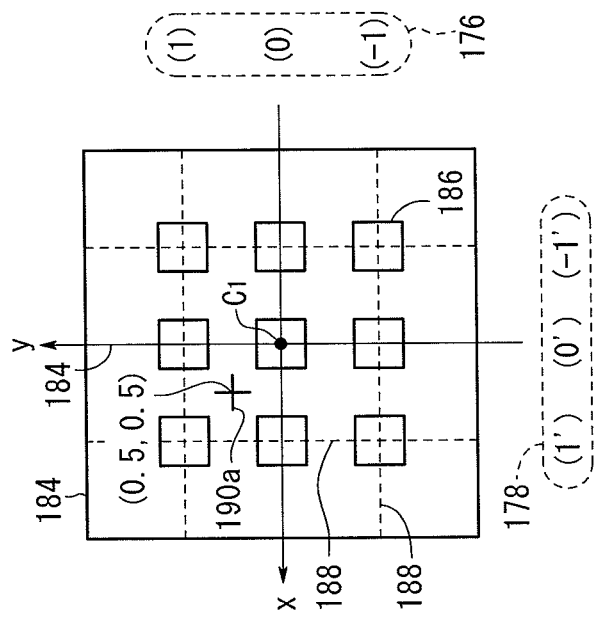

FIGS. 14A and 14B are partial enlarged views of a patch selection image 162 at the time a certain color is selected by the pointer 190 shown in FIG. 6. Row numbers 176 and column numbers 178 are arranged differently from those shown in FIG. 6 for illustrative purposes.

In FIG. 14A, a two-dimensional coordinate system is shown about a row number (0) and a column number (0').

The color at a central position $C_1$ of a color patch 36 is expressed by ($L^*_0+\Delta L^*$, $a^*_0$, $b^*_0$). The color at the position of a pointer 190a which indicates (x, y)=(0.5, 0.5) is calculated as ($L^*_0+\Delta L^*$, $a^*_0+0.5 \cdot \Delta a^*$, $b^*_0+0.5 \cdot \Delta b^*$) according to an interpolating process.

In FIG. 14B, a two-dimensional coordinate system is shown about a row number (0) and a column number (0").

The color at a central position $C_2$ of a color patch 36 is expressed by ($L^*_0-\Delta L^*$, $a^*_0$, $b^*_0$). The color at the position of a pointer 190b which indicates (x, y)=(−0.7, 1.7) is calculated as ($L^*_0-\Delta L^*$, $a^*_0-0.7 \cdot \Delta a^*$, $b^*_0+1.7 \cdot \Delta b^*$) according to an extrapolating process.

If the pointer 190 exceeds the presentation area of the color patches 36, i.e., if x<−1, 1<x (or y<−1, 1<.y), then it is judged as being outside the presentation area of the colors of the color patches 36, and another calculating process may be carried out.

When a color patch 36 having a color in a color area which cannot be reproduced, such as a color outside the gamut or a color area which exhibits high non-linearity and is accordingly reproduced with low accuracy, such as a color near the gamut, is printed, it is preferable to issue a warning in the form of a sound or a displayed image for attention of the operator.

A color patch 186 (see FIG. 6) corresponding to such a color patch 36 should preferably be marked with an identification mark. Marking is not limited to affixing an identification mark near the color patch 186, but may be deformation of the color patch 186 itself.

For example, if a color ($L^*$, $a^*$, $b^*$) calculated according to the equations (4) through (6) is a color outside the gamut, then it is preferable to rewrite the pixel value of the color patch 186 which corresponds to the color and then display a black patch. Therefore, the operator can recognize that the location of the black patch is excluded from selection candidates, before the designated color adjusting color chart 34c is printed.

If a color ($L^*$, $a^*$, $b^*$) calculated according to the equations (4) through (6) is a color within the gamut but in the neighborhood of the gamut boundary, then it is preferable to apply a thick frame around the color patch 186 which corresponds to the color and then display a thick-framed patch. Therefore, the operator can adjust the color while recognizing that the designated color is in the neighborhood of the gamut boundary.

Since the patch selection image 162 is plotted according to specifications equivalent to those for the designated color adjusting color chart 34c, the operator can clearly see how the patch selection image 162 is related to the designated color adjusting color chart 34c.

In order to clearly indicate whether a color belongs to the gamut or not, colors belonging to the gamut and those not belonging to the gamut should preferably be displayed in different forms, e.g., thick-framed patches and black patches. The colors may be displayed in white patches instead of black patches to indicate that they belong to the gamut or not. As a matter of course, identification marks such as ◯, x may be applied near color patches 186 to indicate that they belong to the gamut or not.

Then, the operator determines whether a color that is substantially the same as the designated color has been reproduced by the selected color patch 36 (step S68). If the operator judges that a color that is substantially the same as the designated color has not been reproduced, but there is still a possibility of such a selection, then the operator resets the next reference color and color difference interval (step S69).

Specifically, the operator clicks on a certain position in the matrix image 180 shown in FIG. 6 using the mouse 30 (see FIG. 1) to change the position of the pointer 190. Then, the displayed value in the textbox 164 with a spin button is immediately automatically updated to set a new reference color.

The operator can reset the color difference interval using the textbox 166 with a spin button. For example, the operator may reduce the color difference interval if a more detailed color adjustment is to be carried out, or may increase the color difference interval if the designated color is judged as falling outside the presentation area of the color patches 36.

The above operation requires the operator to be knowledgeable about and proficient in colors to a certain extent. As such, the operator may change the displayed contents of the designated color adjusting color chart 34c by referencing recommended values. When the operator clicks on the button 182 displaying "DETAIL SETTING", the setting screen 160 changes to the setting screen 240 shown in FIG. 8.

In FIG. 8, a patch selection image 242 displayed in an upper area of the setting screen 240 represents an image simulating the two-dimensional layout of the designated color adjusting color chart 34c. The crossing points of auxiliary lines 258 comprising vertical and horizontal lines correspond to the central positions of the color patches 36.

In the patch selection image 242 according to the present embodiment, the shape of the color patches 36 is omitted from illustration. The patch selection image 242 may be displayed in any pattern insofar as it is plotted in such a manner that the operator can recognize the relationship thereof to the color patches 36.

The slider 262 on the slider bar 244 points to the position "5" on the gage 260 at present. The position "5" on the gage 260 represents the number of color patches 36 per side (hereinafter referred to as "patch count") in each of the square-shaped frames of color patches 36. Accordingly, each of L*, a*, b* can take five values, and thus, color patches 36 of 5×5×5=125 are provided in the patch selection image 242.

The operator can move the slider 262 to the left and right to change the patch count in the range from 3 to 7. If the patch count is changed, the patch selection image 242 is immediately changed in its plotted specifications depending on the patch count.

The slider 268 on the slider bar 246 points to a substantially central position on the gage 266 at present. The operator can move the slider 268 to the left and right to change a next color difference interval in a preset range.

The arrows 264, 270 point to positions on the gages 260, 266 which correspond to present recommended values of the "PATCH COUNT" and "NEXT COLOR DIFFERENCE INTERVAL" (see the indicated content of the letter string 272). The recommended values may be determined in view of the history of selections of the color patches 36, the color values of the entered designated color, and the gamut of the printing machine 18.

If the operator is to change settings of the designated color adjusting color chart 34c according to the recommended values or its own preference, the operator clicks on the button 250 displaying "SETTING CHANGE". If the operator is not to change settings of the designated color adjusting color chart 34c, then the operator clicks on the button 248 displaying "RETURN". The setting screen 240 changes back to the setting screen 160 shown in FIG. 6.

After having reset the patch count, the reference color, and the color difference interval, the operator clicks on the button 168 displaying "COLOR CHART PRINT" in FIG. 6. Then, the reset values are supplied to the simulating data generator 79, which generates new image data. The generated new image data are sent to the display device 24, which displays a matrix image 180 based on the supplied new image data. Stated otherwise, the updated matrix image 180 is plotted according to specifications set in the setting screen 240, i.e., according to specifications that are equivalent to those of a designated color adjusting color chart 34c to be printed next.

If a designated color adjusting color chart 34c is printed by the printing machine 18, the number of color patches 36 is changed and the reference color and the color difference interval are changed depending on the setting changes.

After the number of color patches 36 is changed by the slider bar 244 (see FIG. 8), a designated color adjusting color chart 34c may be printed without displaying the setting screen 160 (see FIG. 6) and the setting screen 240 (see FIG. 8) which have the changed number of color patches 36.

As described above, a designated color adjusting color chart 34c is printed based on the next reference color and the color different interval thus reset. The process is canceled if the operator clicks on the button 174 displaying "CANCEL" while the designated color is being adjusted (step S62).

The above process is repeated until a color that is identical to the designated color is reproduced on the designated color adjusting color chart 34c (steps S65 through S69). If it is judged that a color identical to the designated color is reproduced, the operator clicks on the button 172 displaying "FINALIZE".

The print profile is changed based on the color shift corrective amounts calculated in step S64 (see FIG. 11), the color values (L*, a*, b*) of the reference color and the color difference interval (ΔL*, Δa*, Δb*) that are finally set in the setting screen 160 (see FIG. 6) in step S69 (see FIG. 11), and the value indicated by the pointer 190 (step S70). The process of adjusting the designated color is ended.

More specifically, the patch color data converter 88 acquires color values (selected color values, first color values) depending on a color patch selected from the printed color chart as a color that is closest to the designated color. The color values of the designated color are entered as second color values into the main unit 22 via the input device 26 serving as a second acquisition section, and are acquired as such. The profile generator 80 corrects the profile of the printing machine 18 based on the first color values from the patch color data converter 88 and the second color values from the input device 26.

Alternatively, rather than changing the print profile, the data of the electronic manuscript may be directly corrected. The data of the electronic manuscript include, in addition to data of photographs and computer graphics, illustration data of logo marks and data representative of color values of gradations or the like. Those data will be described by way of example below.

When the operator clicks on the button 172 displaying "FINALIZE" (see FIG. 6) in the setting screen 160, final corrected values L*, a*, b* are calculated based on the color shift corrective amounts calculated in step S64, the color values (L*, a*, b*) of the reference color and the color difference interval (ΔL*, Δa*, Δb*) that are finally set in the setting screen 160 (see FIG. 6) in step S69, and the value indicated by the pointer 190. The setting screen 160 now changes to the setting screen 200 shown in FIG. 7.

The display column 202 of the setting screen 200 displays the same contents as the information as to the designated color entered in the setting screen 100 (see FIG. 4). Therefore, the operator can easily confirm the displayed contents. For example, if a spot color name is presented, the spot color name is displayed in the column 212. At the same time, the L*, a*, b* values corresponding to the spot color name are displayed in the column 214, the R, G, B values corresponding to the spot color name are displayed in the column 216, and the C, M, Y, K values corresponding to the spot color name are displayed in the column 218. A process of designating the color values, i.e., "DESIGNATE IN L*a*b*" in this case, is displayed in the column 220.

If the designated color is entered according to "DESIGNATE IN RGB" shown in FIG. 4, then the R, G, B values are displayed in the column 216. If the designated color is entered according to "DESIGNATE IN CMYK", then the C, M, Y, K values are displayed in the column 218. If the designated color is entered according to "DESIGNATE WITH COLOR WHEEL", the L*, a*, b* values are displayed in the column 214.

The pull-down menus 228, 230 initially displays target profiles set by the pull-down menus 107, 108 in the setting screen 100 shown in FIG. 4. According to selected target profiles, the R, G, B values are automatically updated and displayed in the column 224 of the display column 204, and the C, M, Y, K values are automatically updated and displayed in the column 226 of the display column 204.

The R, G, B values are calculated based on a three-dimensional to three-dimensional LUT of the target profile selected by the pull-down menu 228. The C, M, Y, K values are calculated based on a three-dimensional to four-dimensional LUT of the target profile selected by the pull-down menu 230.

The operator confirms the corrected values of the L*, a*, b* values, the R, G, B values, or the C, M, Y, K values, or the spot color name, and thereafter clicks on the button 210 displaying "FINISH". Thereafter, the operator enters the corrected values or the spot color name into a setting screen, not shown. Of the data of the electronic manuscript, those data of a location where the designated color is specified are replaced with the corrected values, thereby adjusting the print color. The $L^*$, $a^*$, $b^*$ values are directly replaced with $L^*$, $a^*$, $b^*$ values, and the R, G, B values or the C, M, Y, K values are replaced with $L^*$, $a^*$, $b^*$ values obtained by using the target profile. In this manner, the color values of the electronic manuscript are corrected.

The management information ($L^*$, $a^*$, $b^*$ values or C, M, Y, K values) of a spot color database managed by the RIP 52 can be automatically or manually updated into the above corrected values. The color of the print 34 can be adjusted by using the updated spot color data. For example, if the $L^*$, $a^*$, $b^*$ values of the spot color database are updated, then the color values of electronic manuscript data defined by $L^*$, $a^*$, $b^*$ values are corrected, and if the C, M, Y, K values of the spot color database are updated, then the color values of electronic manuscript data converted into C, M, Y, K values of the printing machine 18 using the print profile are corrected.

The process of adjusting the designated color is thus completed (step S6).

Figure 15A:
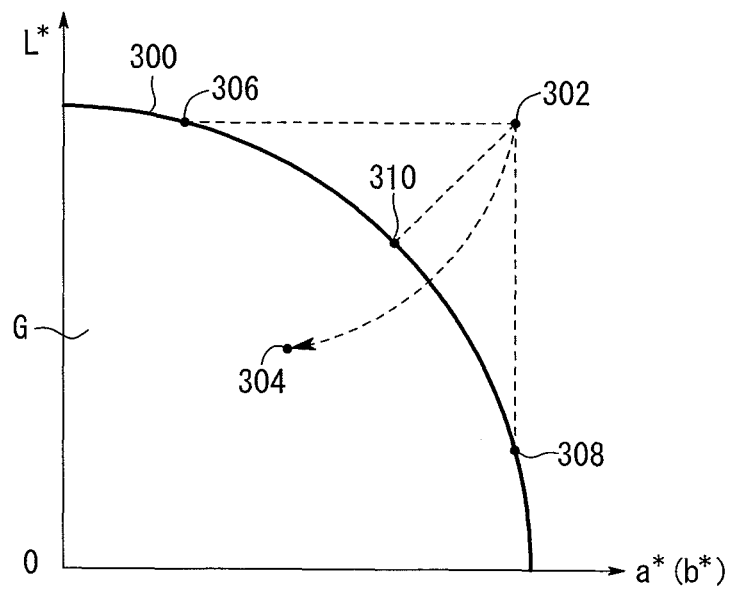
FIGS. 15A and 15B are diagrams illustrative of the concepts of mapping processes based on impression matching, lightness matching, saturation matching, and minimum distance.

The mapping processes described above will be described in detail below with reference to FIG. 15A. As shown in FIG. 15A, a gamut G is expressed as a closed space in a uniform color space of $L^*$, $a^*$, $b^*$ values. For illustrative purposes, the graph shown in the diagram of FIG. 15A has a vertical axis representative of $L^*$ and a horizontal axis representative of $a^*$ or $b^*$.

It is assumed that the gamut G of the printing machine 18 is expressed as a closed area inside a gamut boundary 300. A designated color 302 is judged as being outside of the range of the gamut G. The designated color 302 is converted into a certain color within the gamut G.

A color 304 represents a color mapped by the mapping process based on impression matching. The mapping process based on impression matching is a process for mapping the color according to a different mapping process depending on the color range (blue, yellow, green, red, or the like) of the designated color. The mapping process based on impression matching allows the color to approach the visual sensitivity by correcting a distortion of a CIELAB uniform color space, i.e., a shift between numerical color values and the visual sensitivity.

For example, since the blue region tends to be less sensitive to a change in saturation, if the color range of the designated color is near blue, then it is preferable to select the mapping process based on minimum distance in a JCh space.

A color 306 represents a color mapped by the mapping process based on lightness matching. The mapping process based on lightness matching is a process for mapping the color to a color whose color difference with the designated color 302 is minimum, of the colors within the gamut G whose lightnesses are substantially in agreement with the lightness of the designated color 302.

A color 308 represents a color mapped by the mapping process based on saturation matching. The mapping process based on saturation matching is a process for mapping the color to a color whose color difference with the designated color 302 is minimum, of the colors within the gamut G whose saturations are substantially in agreement with the saturation of the designated color 302.

A color 310 represents a color mapped by the mapping process based on minimum distance. The mapping process based on minimum distance is a process for mapping the color to a color within the gamut G whose color difference with the designated color 302 is minimum.

Figure 15B:
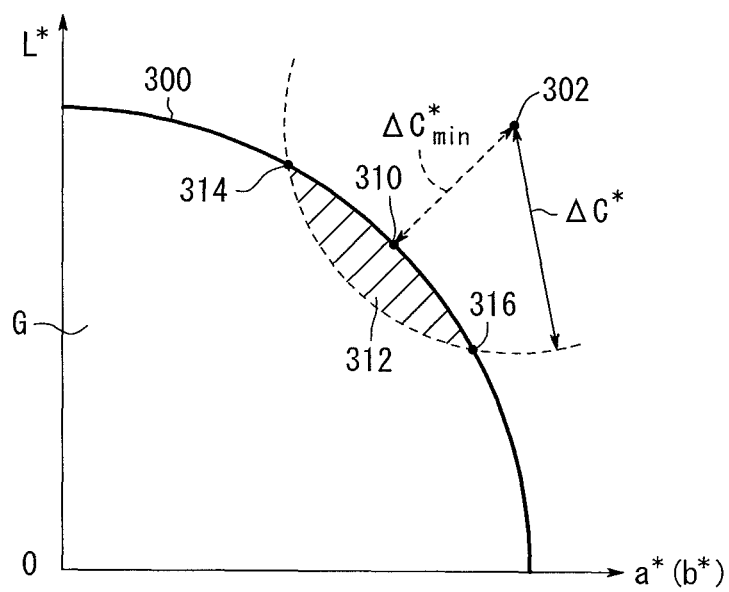

FIG. 15B is a diagram showing a modification of the mapping process based on lightness matching and the mapping process based on saturation matching shown in FIG. 15A.

In FIG. 15A, only the difference between lightness levels or saturation levels is considered, and nothing is taken into account about an allowable value for the color difference with the designated color 302. According to the modification shown in FIG. 15B, a color whose lightness and saturation are substantially in agreement with those of the designated color 302 is selected while taking into account an allowable value for the color difference with the designated color 302.

First, a value $\Delta C^*$ which is greater than the minimum distance $\Delta C^*_{min}$ between the designated color 302 and the gamut G is set as an allowable color difference (allowable error). An overlapping area 312 where a circular area having a radius $\Delta C^*$ about the designated color 302 and the gamut G overlap each other corresponds to an area from which colors can be selected.

A process for selecting and mapping a color 314 whose lightness difference with the designated color 302 is minimum, among the colors within the overlapping area 312, is referred to as lightness priority. A process for selecting and mapping a color 316 whose saturation difference with the designated color 302 is minimum, among the colors within the overlapping area 312, is referred to as saturation priority. These mapping processes may be employed.

Another process for setting the result of selection of a color patch 36 that is closest to the designated color in the designated color adjusting color chart 34c will be described in detail below with reference to FIGS. 16 through 21.

Figure 16:
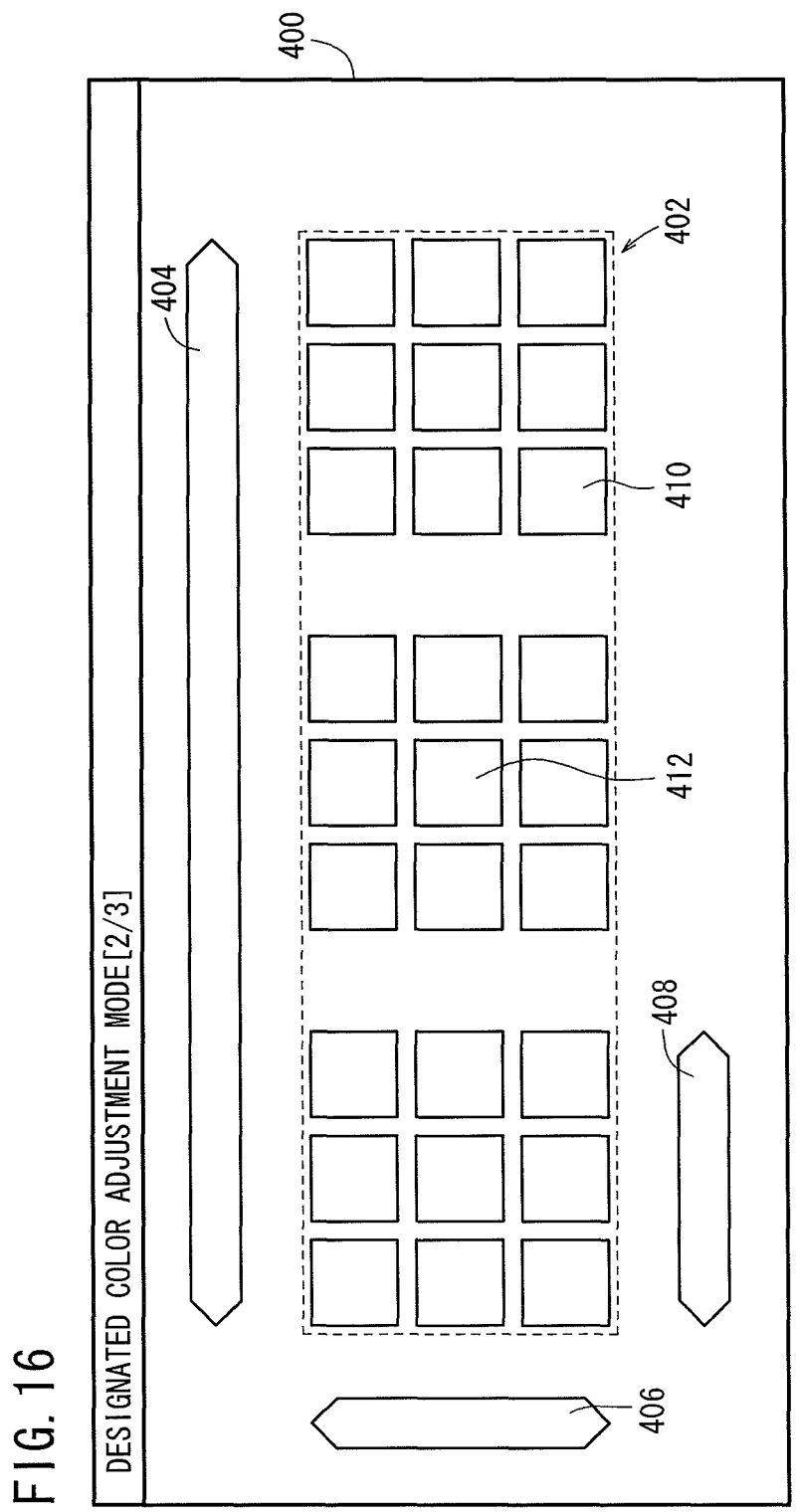
FIG. 16 is a view showing, by way of example, a second setting screen for adjusting a designated color according to a modification of the embodiment.

FIG. 16 shows by way of example a second setting screen for adjusting a designated color according to a modification of the present embodiment.

As shown in FIG. 16, the second setting screen, denoted by 400, includes a patch selection image 402 simulating the designated color adjusting color chart 34c disposed in a central section thereof, and a color bar 404 extending horizontally which is disposed above the patch selection image 402. The color bar 404 is displayed in colors of continuous tone such that $L^*$ is progressively higher from the right end to the left end thereof. The setting screen 400 also includes a color bar 406 extending vertically which is disposed on the left side of the patch selection image 402. The color bar 406 is displayed in colors of continuous tone such that $a^*$ is progressively higher from the lower end to the upper end thereof. The setting screen 400 also includes a color bar 408 extending horizontally which is disposed in a left position below the patch selection image 402. The color bar 408 is displayed in colors of continuous tone such that $b^*$ is progressively higher from the right end to the left end thereof.

The patch selection image 402 is made up of 27 color patches 410 displayed in colors according to the above equations (1) through (3) and as shown in FIG. 13. The 27 color patches 410 include a central color patch 412 displayed in a color which is the presently set reference color. The color bars 404, 406, 408 have a color at their centers which is equal to the reference color (the color of the central patch 412).

Figure 17:
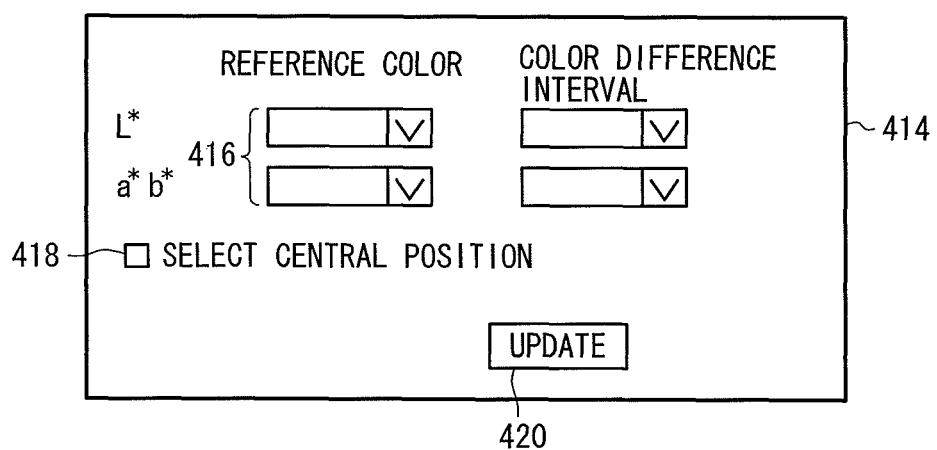
FIG. 17 is a view showing, by way of example, a setting screen which is displayed together with the second setting screen shown in FIG. 16.

As shown in FIG. 17, a setting screen 414 is also displayed in another window. The setting screen 414 includes four pull-down menus 416 for independently changing the patch count and the color difference interval ($\Delta L^*$, $\Delta a^*$, $\Delta b^*$), a checkbox 418 displaying "SELECTION OF CENTRAL POSITION), and a button 420 displaying "UPDATE".

Figure 18:
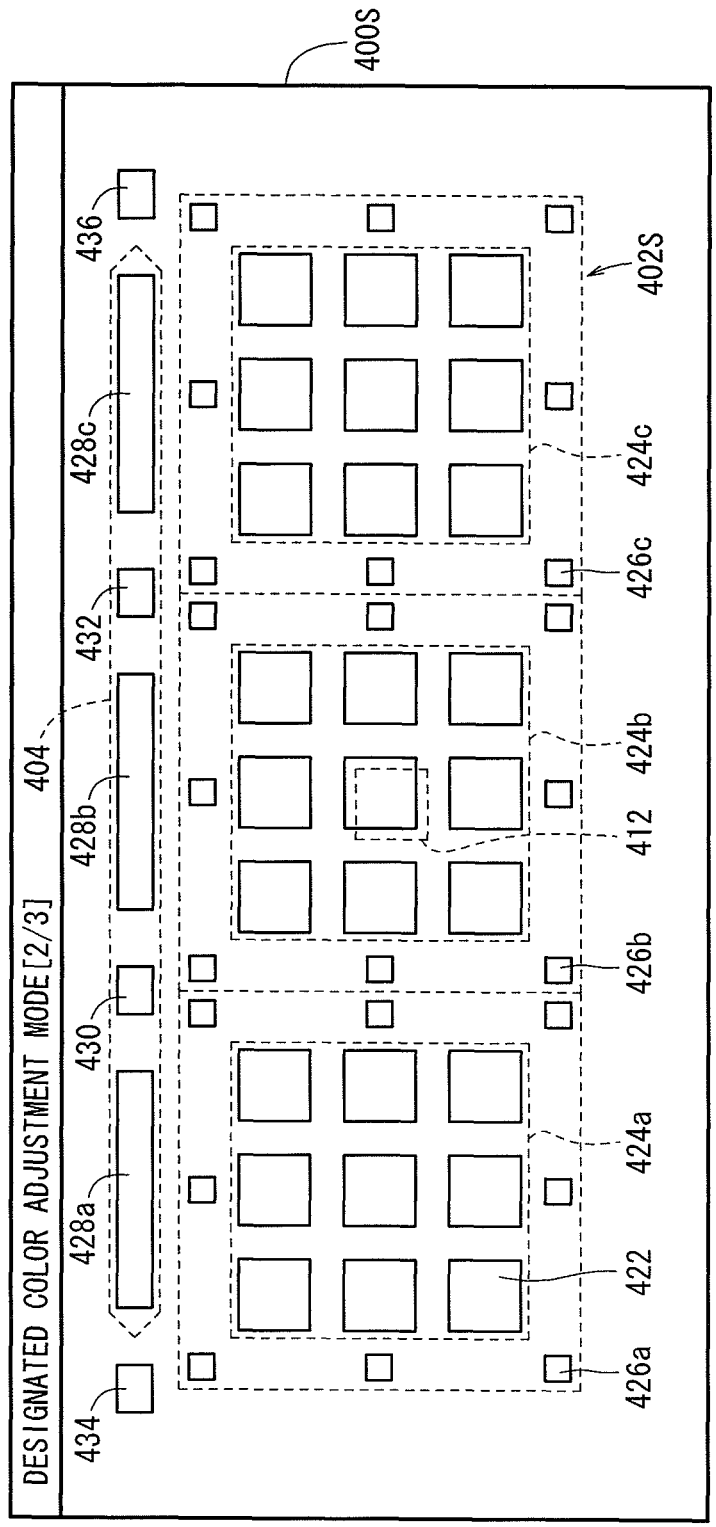
FIG. 18 is a view showing, by way of example, a modified second setting screen for adjusting a designated color according to the embodiment.

If the checkbox 418 in the setting screen 414 is checked and then the button 420 displaying "UPDATE" is clicked in the setting screen 414, the setting screen 400 changes as shown in FIG. 18.

As shown in FIG. 18, the new setting screen 400S includes 27 display patches 422 (display patch groups 424a, 424b, 424c each having display patches in three rows and three columns) disposed in overlapping relation to the color patches 410, eight small buttons 426a, 426b, 426c disposed around the display patches 422, three horizontally elongate buttons 428a, 428b, 428c disposed in overlapping relation to the color bar 404, two small buttons 430, 432 disposed in overlapping relation to the color bar 404, and two small buttons 434, 436 disposed outside the color bar 404. For illustrative purposes, the color patches 410 are omitted from illustration in FIG. 18.

All the buttons are displayed in white, and the display patches 422 are displayed in overlapping relation to the color patches 410 such that the display patches 422 are slightly displaced in position from the color patches 410. The operator is thus able to confirm the displayed colors while selecting a color. In FIG. 18, the position of the central patch 412 is illustrated.

If the operator clicks on one of the display patches 422 using the mouse 30 (see FIG. 1), a mark in the form of a thick frame 438 (see FIG. 19) is applied to the display patch 422 that has been clicked on. Accordingly, any one of the display patches 422 can be designated by being clicked on, and can similarly be canceled or re-designated.

The operator selects a color patch 36 that is closest to the designated color from the designated color adjusting color chart 34c, and clicks on a display patch 422 which corresponds in position to the selected color patch 36. Thereafter, the operator clicks on the button 420 displaying "UPDATE" (see FIG. 17) in the setting screen 414, thereby setting a next reference color and updating the displayed color so that the color of the central patch 412 changes to the next reference color.

Figure 19:
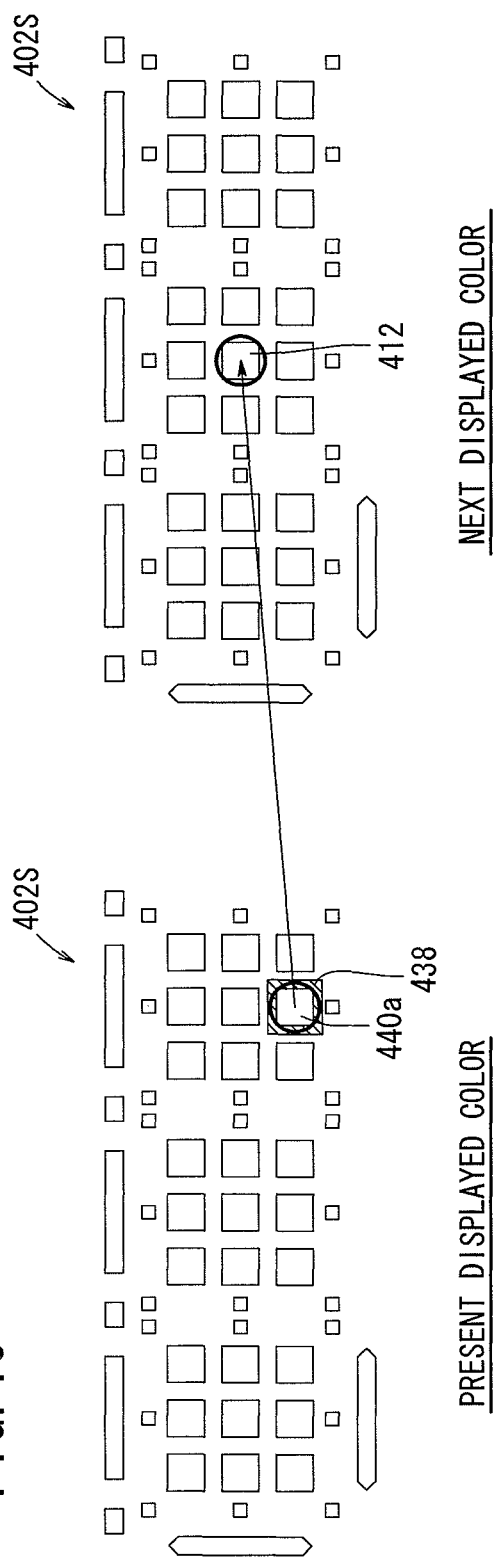
FIG. 19 is a view showing a manner in which a color corresponding to a selected displayed patch is set as a new reference color if one displayed patch is designated.

As shown in FIG. 19, if one display patch 422 (display patch 440a) is designated, the color corresponding to the selected display patch 422 is set as a new reference color, and the displayed color of the patch selection image 402S is updated.

Figure 20:
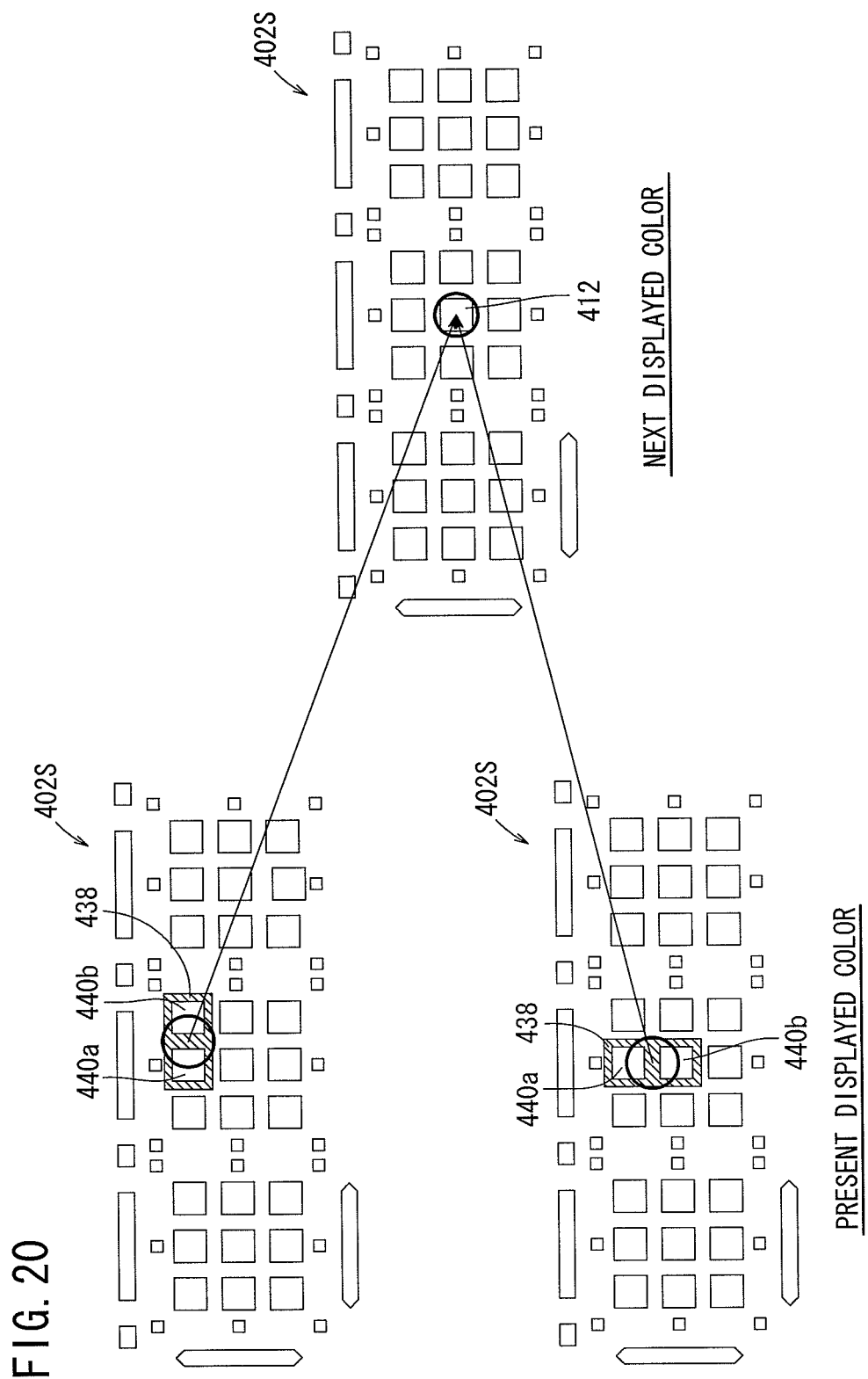
FIG. 20 is a view showing a manner in which a color corresponding to selected displayed patches is set as a new reference color if two displayed patches are designated.

As shown in FIG. 20, the operator can click on two display patches 422 which are vertically or horizontally adjacent to each other so as to simultaneously designate those two display patches 422. As described above, if two display patches 422 (display patches 440a, 440b in this case) are designated, an intermediate color between the two colors corresponding to the selected two display patches 422 is set as a new reference color, and the displayed color of the patch selection image 402S is updated.

Figure 21:
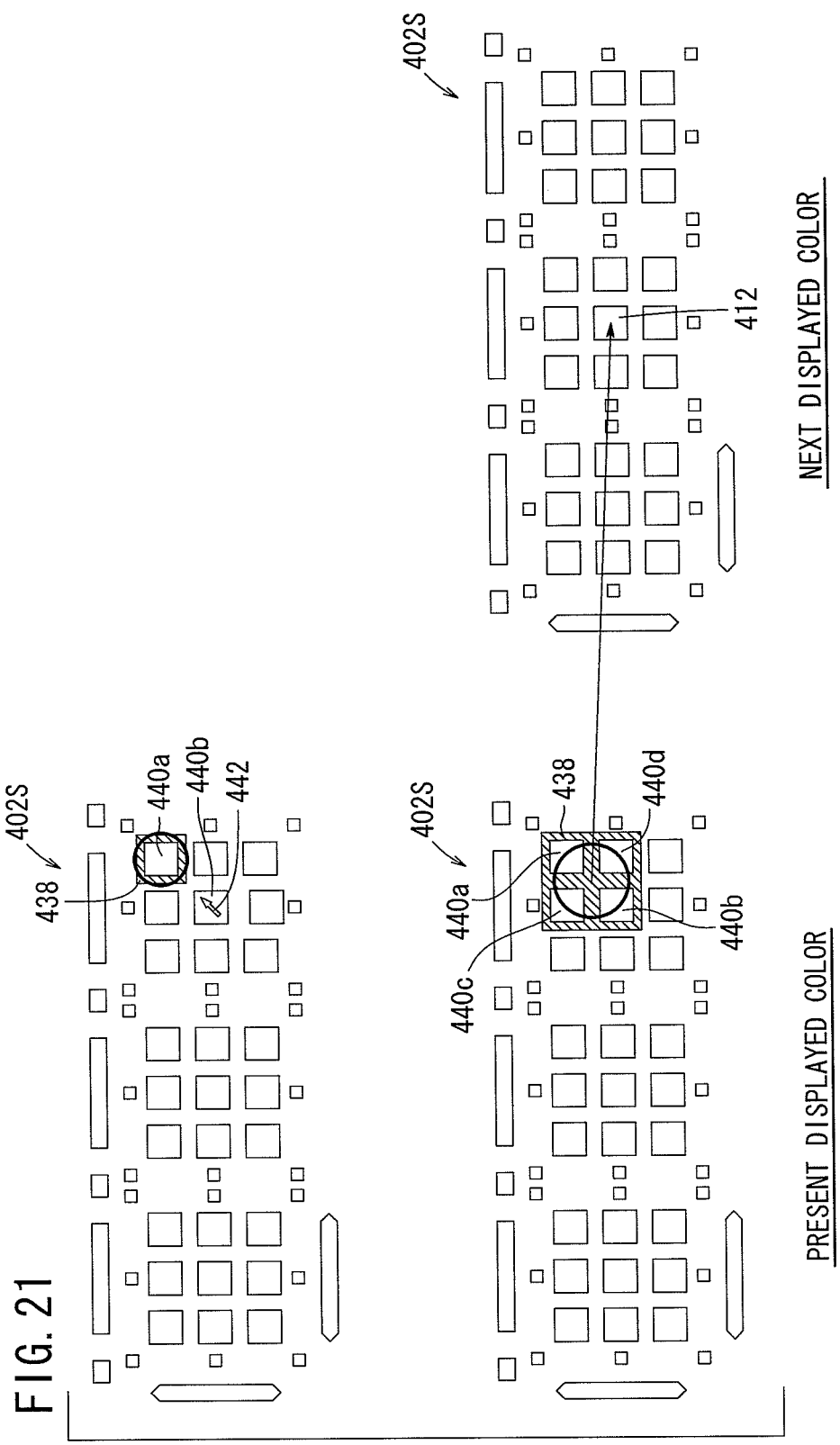
FIG. 21 is a view showing a manner in which a color corresponding to selected displayed patches is set as a new reference color if four displayed patches are designated.

As shown in FIG. 21, the operator can click on two obliquely adjacent display patches 422 (at the position of a mouse pointer 442) so as to simultaneously designate the four adjacent display patches 422. If the four display patches 422 (display patches 440a through 440d in this case) are designated, an intermediate color among the four colors corresponding to the selected four display patches 422 is set as a new reference color, and the displayed color of the patch selection image 402S is updated.

If the operator clicks on the button 420 displaying "UPDATE" (see FIG. 17) with the two or four display patches 422 being designated, a search range for the designated color is judged as having been further narrowed, and a next color difference interval is automatically set to a smaller value. In this manner, a more detailed color searching process can be performed.

In case that the operator clicks on either one of the 24 small buttons 426a through 426c around the display patches 422 shown in FIG. 18, the displayed color is moved.

More specifically, in case that the operator clicks on the upper central small button 426a, the displayed color is moved such that the value of a* increases by $\Delta a^*$. When the operator clicks on the upper left small button 426a, the displayed color is moved such that the values of a*, b* increase by $\Delta a^*$, $\Delta b^*$. Since the positions of the small buttons 426a through 426c and the directions in which the displayed color is moved are associated with each other, the operator finds it easy to operate the new setting screen 400S.

For manually adjusting L*, the operator uses the horizontally elongate buttons 428a through 428c and the small buttons 430, 432, 434, 436. It is assumed hereinbelow that the presently set color difference interval (lightness component) is set to $\Delta L^*$.

The horizontally elongate buttons 428a through 428c serve as buttons for moving the displayed color in increments of $\Delta L^*$. For example, if the operator clicks on the horizontally elongate button 428b, the display patch 422 designated at the time (e.g., the central patch of the display patch group 424a) is moved to a corresponding position in the display patch group 424b below the horizontally elongate button 428b that has been clicked on (i.e., the position of the central patch of the display patch group 424b). In other words, the displayed color is moved such that the value of L* is reduced by $\Delta L^*$.

The small buttons 430, 432 serve as buttons for moving the displayed color in increments of $\Delta L^*/2$. For example, if the operator clicks on the small button 430, the displayed color is moved such that the color of the next central patch 412 has an intermediate value between the display patch groups 424a, 424b. In other words, the displayed color is moved such that the value of L* is reduced by $\Delta L^*/2$.

Likewise, if the operator clicks on the small button 432, the displayed color is moved such that the color of the next central patch 412 has an intermediate value between the display patch groups 424b, 424c. In other words, the displayed color is moved such that the value of L* is reduced by $\Delta L^*/2$.

The small buttons 434, 436 serve as buttons for moving the displayed color in increments of $2\Delta L^*$. For example, if the operator clicks on the small button 434, the present display patch group 424a is moved to the position of the next display patch group 424c. In other words, the displayed color is moved such that the value of L* is reduced by $2\Delta L^*$.

Likewise, if the operator clicks on the small button 436, the present display patch group 424c is moved to the position of the next display patch group 424a. In other words, the displayed color is moved such that the value of L* is reduced by $2\Delta L^*$.

The present invention is not limited to the above embodiment. Various changes and modifications can be made without departing from the scope of the invention.

In the above embodiment, the color patches 36 of the designated color adjusting color chart 34c are rectangular in shape. However, the color patches 36 are not limited to being rectangular in shape, but may be of a triangular shape, a hexagonal shape, a circular shape, or the like.

The color patches 36 may be arranged in any of various layouts, insofar as their corresponding relationship to the identification information is clear. For example, if the color patches 36 are of a regular hexagonal shape, then the color patches 36 may be arranged in a honeycomb pattern.

In the above embodiment, the row numbers 38 and the column numbers 40 (see FIG. 2) included in the designated color adjusting color chart 34c are entered as identification information into the setting screen 160 (see FIG. 6). However, the identification information may be entered in other ways.

In the above embodiment, the printing machine 18 comprises an inkjet printing apparatus. However, the printing machine 18 may comprise an electrophotographic apparatus, a thermosensitive apparatus, or the like. The printing machine 18 may output not only a hard copy, but also a soft copy. Stated otherwise, the printing machine 18 may comprise any of various image display apparatus for displaying images based on various principles.

Although certain preferred embodiments of the present invention have been shown and described in detail, it should be understood that various changes and modifications may be made to the embodiments without departing from the scope of the invention as set forth in the appended claims.

What is claimed is:

1. A color selecting method of printing a color chart having a plurality of color patches of a reference color and colors close to the reference color with a printing machine and selecting one of the color patches whose color is closest to a designated color from the color chart, comprising:

an entering step of entering color values of the designated color;

a determining step of determining whether the designated color whose color values are entered is a color within a gamut of the printing machine or not;

a mapping step of mapping the designated color to converted colors within the gamut according to a plurality of gamut mapping processes, if the designated color is judged as being not a color within the gamut;

a displaying step of displaying the converted colors as a plurality of candidate colors;

a selecting step of selecting one of the displayed candidate colors, depending on a predetermined selection operation; and a setting step of setting the designated color as the reference color if the designated color is judged as being a color within the gamut, and setting the selected one of the candidate colors as the reference color if the designated color is judged as being not a color within the gamut;

wherein the gamut mapping processes include a process for employing a different gamut mapping process depending on a color range of the designated color;

wherein the plurality of gamut mapping processes is selected from the group consisting of impression matching, lightness matching, saturation matching, and minimum distance.

2. A color selecting method according to claim 1, wherein the gamut mapping processes include a process for employing a different gamut mapping process depending on a color range of the designated color.

3. A color selecting method according to claim 1, wherein the determining step further determines whether or not the designated color is a color near a boundary of the gamut, the color selecting method further comprising a warning step of issuing a warning if the designated color is judged as being a color near the boundary of the gamut.

4. A color selecting method according to claim 3, wherein the warning step issues a warning if the designated color is judged as being a color within the gamut and if the designated color is judged as being a color near the boundary of the gamut.

5. A color selecting method according to claim 1, further comprising:

a second determining step of determining whether the designated color whose color values are entered is a color within a gamut of each print medium or not; and a second displaying step of displaying the result of whether the designated color is a color within the gamut of each print medium or not, for each print medium.

6. A color selecting method according to claim 5, wherein the second displaying step displays only information about a print medium with respect to which the designated color is judged as being a color within the gamut.

7. A color selecting method according to claim 1, wherein in the displaying step, the plurality of candidate colors and the designated color are displayed at successively arranged positions.

8. The method of claim 7, wherein the step of selecting one of the displayed candidate colors comprises operator selection of the displayed candidate colors.

9. A color selecting method according to claim 1, wherein the plurality of gamut mapping processes includes at least two of the group consisting of impression matching, lightness matching, saturation matching, and minimum distance.

10. A color selecting method of printing a color chart having a plurality of color patches of a reference color and colors close to the reference color, with a printing machine and selecting one of the color patches whose color is closest to a designated color from the color chart, comprising:

an entering step of entering color values of the designated color;

a determining step of determining whether the designated color whose color values are entered is a color within a gamut of the printing machine or not;

a selecting step of selecting one of a plurality of gamut mapping processes if the designated color is judged as being not a color within the gamut;

a mapping step of mapping the designated color to a converted color within the gamut according to the selected one of the gamut mapping processes;

a displaying step of displaying the converted colors as a plurality of candidate colors;

a display candidate selecting step of selecting one of the displayed candidate colors, depending on a predetermined selection operation and a setting step of setting the candidate color as the reference color;

wherein the gamut mapping processes include a process for employing a different gamut mapping process depending on a color range of the designated color;

wherein the plurality of gamut mapping processes is selected from the group consisting of impression matching, lightness matching, saturation matching, and minimum distance.

11. An image processing method comprising:

an entering step of entering color values of a designated color to be reproduced by a printing machine;

a determining step of determining whether the designated color whose color values are entered is a color within a gamut of the printing machine or not;

a mapping step of mapping the designated color to converted colors within the gamut according to a plurality of gamut mapping processes, if the designated color is judged as being not a color within the gamut;

a displaying step of displaying the converted colors as a plurality of candidate colors;

a selecting step of selecting one of the displayed candidate colors, depending on a predetermined selection operation;

a setting step of setting the designated color as a reference color if the designated color is judged as being a color within the gamut, and setting the selected one of the candidate colors as the reference color if the designated color is judged as being not a color within the gamut;

a printing step of printing a color chart having a plurality of color patches of the set reference color and colors close to the set reference color with the printing machine;

a first acquiring step of acquiring color values depending on one of the color patches which is selected from the printed color chart as representing a color that is closest to the designated color, as first color values;

a second acquiring step of acquiring color values of the designated color as second color values; and a correcting step of correcting a profile of the printing machine based on the acquired first color values and second color values;

wherein the gamut mapping processes include a process for employing a different gamut mapping process depending on a color range of the designated color;

wherein the plurality of gamut mapping processes is selected from the group consisting of impression matching, lightness matching, saturation matching, and minimum distance.

12. An image processing method according to claim 11, in the printing step, the color chart is printed such that the color patches are placed in a two-dimensional pattern, and color differences between adjacent color patches, which surround the reference color and are placed in a same row or column, are at a substantially equal interval in a uniform color space.

13. An image processing method comprising:

an entering step of entering color values of a designated color to be reproduced by a printing machine;

a determining step of determining whether the designated color whose color values are entered is a color within a gamut of the printing machine or not;

a mapping step of mapping the designated color to converted colors within the gamut according to a plurality of gamut mapping processes, if the designated color is judged as being not a color within the gamut;

a displaying step of displaying the converted colors as a plurality of candidate colors;

a selecting step of selecting one of the displayed candidate colors, depending on a predetermined selection operation;

a setting step of setting the designated color as a reference color if the designated color is judged as being a color within the gamut, and setting the selected one of the candidate colors as the reference color if the designated color is judged as being not a color within the gamut;

a printing step of printing a color chart having a plurality of color patches of the set reference color and colors close to the set reference color with the printing machine;

an acquiring step of acquiring color values depending on one of the color patches which is selected from the printed color chart as representing a color that is closest to the designated color, as selected color values;

a converting step of converting the acquired selected color values into device-depending data according to a target profile; and a displaying step of displaying at least one of the device-depending data and the acquired selected color values;

wherein the gamut mapping processes include a process for employing a different gamut mapping process depending on a color range of the designated color;

wherein the plurality of gamut mapping processes is selected from the group consisting of impression matching, lightness matching, saturation matching, and minimum distance.

14. An image processing method according to claim 13, in the printing step, the color chart is printed such that the color patches are placed in a two-dimensional pattern, and color differences between adjacent color patches, which surround the reference color and are placed in a same row or column, are at a substantially equal interval in a uniform color space.

15. An image processing apparatus comprising:

an input device for entering color values of a designated color to be reproduced by a printing machine;

a determining section for determining whether the designated color whose color values are entered by the input device is a color within a gamut of the printing machine or not;

a mapping section for mapping the designated color to converted colors within the gamut according to a plurality of gamut mapping processes, if the designated color is judged as being not a color within the gamut by the determining section;

a displaying section for displaying the converted colors as a plurality of candidate colors;

a selector for selecting one of the displayed candidate colors, depending on a predetermined selection operation obtained by mapping with the mapping section;

a setter for setting the designated color as a reference color if the designated color is judged as being a color within the gamut, and setting the one of the candidate colors selected by the selector, as the reference color if the designated color is judged as being not a color within the gamut;

a print controller for controlling a printing machine to print a color chart having a plurality of color patches of the reference color set by the setter and colors close to the set reference color;

a first acquisition section for acquiring color values depending on one of the color patches which is selected from the printed color chart as representing a color that is closest to the designated color, as first color values;

a second acquisition section for acquiring color values of the designated color as second color values; and a corrector for correcting a profile of the printing machine based on the acquired first color values and second color values;

wherein the gamut mapping processes include a process for employing a different gamut mapping process depending on a color range of the designated color;

wherein the plurality of gamut mapping processes is selected from the group consisting of impression matching, lightness matching, saturation matching, and minimum distance.

16. An image processing apparatus comprising:

an input device for entering color values of a designated color to be reproduced by a printing machine;

a gamut inside/outside determining section for determining whether the designated color whose color values are entered by the input device is a color within a gamut of the printing machine or not;

a mapping section for mapping the designated color to converted colors within the gamut according to a plurality of gamut mapping processes, if the designated color is judged as being not a color within the gamut by the gamut inside/outside determining section;

a displaying section for displaying the converted colors as a plurality of candidate colors;

a selector for selecting one of the displayed candidate colors, depending on a predetermined selection operation obtained by mapping with the mapping section;

a setter for setting the designated color as a reference color if the designated color is judged as being a color within the gamut, and setting the one of the candidate colors selected by the selector as the reference color if the designated color is judged as being not a color within the gamut;

a print controller for controlling the printing machine to print a color chart having a plurality of color patches of the reference color and colors close to the reference color;

an acquisition section for acquiring color values depending on one of the color patches which is selected from the printed color chart as representing a color that is closest to the designated color, as selected color values;

a data converter for converting the selected color values acquired by the acquisition section into device-depending data according to a target profile; and a display device for displaying at least one of the device-depending data obtained by conversion by the data converter and the acquired selected color values;

wherein the gamut mapping processes include a process for employing a different gamut mapping process depending on a color range of the designated color;

wherein the plurality of gamut mapping processes is selected from the group consisting of impression matching, lightness matching, saturation matching, and minimum distance.

17. A computer-readable recording medium storing a program for enabling a computer to perform the functions of:

entering color values of a designated color to be reproduced by a printing machine;

determining whether the designated color whose color values are entered is a color within a gamut of the printing machine or not;

mapping the designated color to converted colors within the gamut according to a plurality of gamut mapping processes, if the designated color is judged as being not a color within the gamut;

displaying the converted colors as a plurality of candidate colors;

selecting one of the displayed candidate colors, depending on a predetermined selection operation;

setting the designated color as a reference color if the designated color is judged as being a color within the gamut, and setting the selected one of the candidate colors as the reference color if the designated color is judged as being not a color within the gamut;

generating image data of a color chart having a plurality of color patches of the set reference color and colors close to the set reference color; and controlling the printing machine to print the color chart based on the generated image data;

wherein the gamut mapping processes include a process for employing a different gamut mapping process depending on a color range of the designated color;

wherein the plurality of gamut mapping processes is selected from the group consisting of impression matching, lightness matching, saturation matching, and minimum distance.

\* \* \* \* \*